United States Patent
Lei

(10) Patent No.: US 11,106,975 B2
(45) Date of Patent: Aug. 31, 2021

(54) FAST NEURAL NETWORK IMPLEMENTATIONS BY INCREASING PARALLELISM OF CELL COMPUTATIONS

(71) Applicant: ASAPP, INC., New York, NY (US)

(72) Inventor: Tao Lei, Jersey City, NJ (US)

(73) Assignee: ASAPP, INC., New York, NY (US)

( * ) Notice: Subject to any disclaimer, the term of this patent is extended or adjusted under 35 U.S.C. 154(b) by 956 days.

(21) Appl. No.: 15/789,241

(22) Filed: Oct. 20, 2017

(65) Prior Publication Data
US 2019/0122101 A1 Apr. 25, 2019

(51) Int. Cl.
| | |
|---|---|
| *G06N 3/04* | (2006.01) |
| *G06N 5/04* | (2006.01) |
| *G06F 17/16* | (2006.01) |
| *G06N 3/08* | (2006.01) |
| *G06N 3/063* | (2006.01) |

(52) U.S. Cl.
CPC ............ *G06N 3/08* (2013.01); *G06F 17/16* (2013.01); *G06N 3/04* (2013.01); *G06N 3/0445* (2013.01); *G06N 3/063* (2013.01); *G06N 3/084* (2013.01); *G06N 3/0454* (2013.01); *G06N 3/082* (2013.01)

(58) Field of Classification Search
CPC ........ G06F 17/16; G06N 3/04; G06N 3/0445; G06N 5/046
See application file for complete search history.

(56) References Cited

U.S. PATENT DOCUMENTS 10,127,495 B1 * 11/2018 Bopardikar ........ G06K 9/00288

OTHER PUBLICATIONS

Lu, Yuzhen, and Fathi M. Salem. "Simplified gating in long short-term memory (lstm) recurrent neural networks." 2017 IEEE 60th International Midwest Symposium on Circuits and Systems (MWSCAS). IEEE, 2017. (Year: 2017).*
Appleyard, Jeremy et al., "Optimizing Performance of Recurrent Neural Networks on GPUs", arXiv:1604.01946v1, Apr. 7, 2016, 9 pages.
Balduzzi, David et al., "Strongly-typed recurrent neural networks", Proceedings of 33th International Conference on Machine Learning (ICML), arXiv:1602.02218v2, May 24, 2016, 10 pages.

(Continued)

*Primary Examiner* — Hal Schnee
(74) *Attorney, Agent, or Firm* — GTC Law Group PC & Affiliates

(57) ABSTRACT

The amount of time required to train a neural network may be decreased by modifying the neural network to allow for greater parallelization of computations. The computations for cells of the neural network may be modified so that the matrix-vector multiplications of the cell do not depend on a previous cell and thus allowing the matrix-vector computations to be performed outside of the cells. Because the matrix-vector multiplications can be performed outside of the cells, they can be performed in parallel to decrease the computation time required for processing a sequence of training vectors with the neural network. The trained neural network may be applied to a wide variety of applications, such as performing speech recognition, determining a sentiment of text, determining a subject matter of text, answering a question in text, or translating text to another language.

20 Claims, 13 Drawing Sheets

(56) References Cited

OTHER PUBLICATIONS

Bradbury, James et al., "Quasi-recurrent neural networks", Under review as a conference paper at ICLR 2017, arXiv:1611.01576v2, Nov. 21, 2016, 11 pages.
Chen, Danqi , "ReadingWikipedia to Answer Open-Domain Questions", Proceedings of the 55th Annual Meeting of the Association for Computational Linguistics, Vancouver, Canada, Jul. 30-Aug. 4, 2017, Association for Computational Linguistics, 2017, pp. 1870-1879.
Cho, Kyunghyun et al., "Learning Phrase Representations using RNN Encoder-Decoder for Statistical Machine Translation", Proceedings of the 2014 Conference on Empirical Methods in Natural Language Processing (EMNLP), arXiv:1406.1078v3, 2014, 15 pages.
Diamos, Greg et al., "Persistent RNNs: Stashing Recurrent Weights On-Chip", Proceedings of the 33rd International Conference on Machine Learning, New York, NY, USA, 2016, pp. 2024-2033.
Gal, Yarin et al., "A Theoretically Grounded Application of Dropout in Recurrent Neural Networks", In Advances in Neural Information Processing Systems 29 (NIPS), arXiv:1512.05287v5, Oct. 2016, 14 pages.
Godfrey, John J. et al., "SWITCHBOARD: telephone speech corpus for research and development", Proceedings of the 1992 IEEE International Conference on Acoustics, Speech and Signal Processing (ICASSP), San Francisco, California, Mar. 23-26, 1992, 1992, pp. 517-520.
Goyal, Priya et al., "Accurate, Large Minibatch SGD: Training ImageNet in 1 Hour", arXiv:1706.02677v1, 2017, 12 pages.
Greff, Klaus et al., "LSTM: A Search Space Odyssey", Transactions on Neural Networks and Learning Systems, arXiv:1503.04069v2, submitted on Mar 13, 2015, Oct. 4, 2017, 12 pages.
He, Kaiming et al., "Deep Residual Learning for Image Recognition", Proceedings of the IEEE conference on computer vision and pattern recognition, 2016, pp. 770-778.
Hinton, G.E , "Improving neural networks by preventing co-adaptation of feature detectors", arXiv:1207.0580v1, Jul. 3, 2012, 18 pages.
Hochreiter, Sepp et al., "Long Short-Term Memory", Neural Computation, vol. 9, iss. 8, 1997, pp. 1735-1780.
Hsu, Wei-Ning et al., "A prioritized grid long short-term memory RMN for speech recognition", 2016 IEEE Spoken Language Technology Workshop (SLT), San Diego California, Dec. 13-16, 2016, 2016, 7 pages.
Hu, Minqing et al., "Mining and summarizing customer reviews", Proceedings of the Tenth ACM SIGKDD International Conference on Knowledge Discovery and Data Mining, ACM, 2004, pp. 168-177.
Inan, Hakan , "Tying word vectors and word classifiers: A loss framework for language modeling", arXiv preprint arXiv:1611.01462, published as a conference paper at ICLR 2017, 2016, 13 pages.
Jean, SéBastien et al., "On using very large target vocabulary for neural machine translation", Proceedings of the 53rd Annual Meeting of the Association for Computational Linguistics and the 7th International Joint Conference on Natural Language Processing (vol. 1: Long Papers), arXiv:1412.2007v2, 2015, 10 pages.
Kim, Yoon , "Convolutional Neural Networks for Sentence Classification", Proceedings of the 2014 Conference on Empirical Methods in Natural Language Processing (EMNLP), Oct. 25-29, 2014, Doha, Qatar, 2014, pp. 1746-1751.
Kingsbury, Brian et al., "Scalable Minimum Bayes Risk Training of Deep Neural Network Acoustic Models Using Distributed Hessian-free Optimization", 13th Annual Conference of the International Speech Communication Association, INTERSPEECH, 2012, pp. 10-13.
Klein, Guillaume et al., "OpenNMT: Open-Source Toolkit for Neural Machine Translation", Proceedings of ACL 2017, System Demonstrations, arXiv:1701.02810v2, 2017, 6 pages.
Kuchaiev, Oleksii et al., "Factorization Tricks for LSTM Networks", Workshop track—ICLR 2017, arXiv preprint, arXiv:1703.10722v2, May 4, 2017, 5 pages.
Lee, Kenton et al., "Recurrent Additive Networks", arXiv preprint, arXiv:1705.07393v2, Jun. 29, 2017, 16 pages.
Lei, Tao et al., "Deriving neural architectures from sequence and graph kernels", ICML, 2017, Proceedings of the 34th International Conference on Machine Learning, Sydney, Australia, PMLR 70, arXiv:1705.09037v2, 2017, 22 pages.
Lei, Tao et al., "Molding CNNs for text: non-linear, non-consecutive convolutions", Proceedings of the 2015 Conference on Empirical Methods in Natural Language Processing, Association for Computational Linguistics, arXiv:1508.04112v2, Aug. 18, 2015, 11 pages.
Lei, Tao et al., "Semi-supervised question retrieval with gated convolutions", Proceedings of the 2016 Conference of the North American Chapter of the Association for Computational Linguistics: Human Language Technologies, arXiv:1512.05726v2, Apr. 4, 2016, 12 pages.
Lei, Tao et al., "Training RNNs as Fast as CNNs", arXiv:1709.02755v2, Sep. 12, 2017, 15 pages.
Li, Liangyou et al., "The DCU-ICTCAS MT system at WMT 2014 on German-English Translation Task", Proceedings of the Ninth Workshop on Statistical Machine Translation, Baltimore, Maryland, Jun. 26-27, 2014, Association for Computational Linguistics, 2014, pp. 136-141.
Li, Xin et al., "Learning question classifiers", Proceedings of the 19th International Conference on Computational Linguistics—vol. 1, Association for Computational Linguistics, 2002, 7 pages.
Lodhi, Huma et al., "Text classification using string kernels", Journal of Machine Learning Research, vol. 2, Feb. 2002, pp. 419-444.
Luong, Minh-Thang et al., "Effective Approaches to Attention-based Neural Machine Translation", Empirical Methods in Natural Language Processing (EMNLP), Association for Computational Linguistics, arXiv:1508.04025v5, 2015, 11 pages.
Melis, Gabor et al., "On the State of the Art of Evaluation in Neural Language Models", arXiv preprint, arXiv:1707.05589v1, Jul. 18, 2017, 7 pages.
Miao, Yajie et al., "Simplifying long short-term memory acoustic models for fast training and decoding", 2016 IEEE International Conference on Acoustics, Speech and Signal Processing (ICASSP), 2016, pp. 2284-2288.
Mikolov, Tomas et al., "Recurrent neural network based language model", Interspeech 2010, Sep. 26-30, 2010, Makuhari, Chiba, Japan, 2010, pp. 1045-1048.
Pang, Bo et al., "A sentimental education: Sentiment analysis using subjectivity summarization based on minimum cuts", Proceedings of the 42nd annual meeting on Association and Computational Linguistics, Association for Computational Linguistics, 2004, pp. 271-278.
Pang, Bo et al., "Seeing stars: Exploiting class relationships for sentiment categorization with respect to rating scales", Proceedings of the 43rd annual meeting on association for computational linguistics, Association for Computational Linguistics, 2005, pp. 115-124.
Peitz, Stephan et al., "The RWTH Aachen German-English Machine Translation System for WMT 2014", Proceedings of the Ninth Workshop on Statistical Machine Translation, Baltimore, Maryland, Jun. 26-27, 2014, 2014, pp. 157-162.
Povey, Daniel et al., "Purely sequence-trained neural networks for ASR based on lattice-free MMI. INTERSPEECH", INTERSPEECH, 2016, 5 pages.
Povey, Daniel et al., "The Kaldi Speech Recognition Toolkit", IEEE 2011 Workshop on Automatic Speech Recognition and Understanding, Hawaii, US, IEEE Signal Processing Society, 2011, 4 pages.
Press, Ofir et al., "Using the Output Embedding to Improve Language Models", Proceedings of the 15th Conference of the European Chapter of the Association for Computational Linguistics (EACL), 2017, 7 pages.

(56) References Cited

OTHER PUBLICATIONS

Rajpurkar, Pranav et al., "SQuAD: 100,000+ Questions for Machine Comprehension of Text", Proceedings of the 2016 Conference on Empirical Methods in Natural Language Processing (EMNLP), Austin, Texas, Nov. 1-5, 2016, Association for Computational Linguistics, 2016, pp. 2383-2392.

Sainath, Tara N. et al., "Convolutional, Long Short-Term Memory, Fully Connected Deep Neural Networks", IEEE International Conference on Acoustics, Speech and Signal Processing,, 2015, 5 pages.

Sak, Hasim et al., "Long Short-Term Memory Recurrent Neural Network Architectures for Large Scale Acoustic Modeling", Proceedings of the Annual Conference of the International Speech Communication Association, INTERSPEECH, 2014, 5 pages.

Saon, George, "The IBM 2016 English Conversational Telephone Speech Recognition System", arXiv:1604.08242v2, Jun. 22, 2016, 5 pages.

Seide, Frank et al., "Feature engineering in context-dependent deep neural networks for conversational speech transcription", IEEE Workshop on Automatic Speech Recognition and Understanding (ASRU), 2011, 6 pages.

Shazeer, Noam et al., "Outrageously large neural networks: The sparsely-gated mixture-of-experts layer", Under review as a conference paper at ICLR 2017, arXiv:1701.06538v1, Jan. 23, 2017, 19 pages.

Socher, Richard et al., "Recursive Deep Models for Semantic Compositionality Over a Sentiment Treebank", Proceedings of the 2013 Conference on Empirical Methods in Natural Language Processing, Oct. 2013, pp. 1631-1642.

Srivastava, Rupesh K., "Training very deep networks", Advances in neural information processing systems, arXiv:1507.06228v2, Nov. 23, 2015, 11 pages.

Vaswani, Ashish et al., "Attention is all you need", arXiv preprint arXiv:1706.03762v4, Jun. 30, 2017, 15 pages.

Wiebe, Janyce et al., "Annotating Expressions of Opinions and Emotions in Language", Language Resources and Evaluation, vol. 39, iss. 2-3, 2005, pp. 165-210.

Williams, Ronald J. et al., "An efficient gradient-based algorithm for on-line training of recurrent network trajectories", Neural computation, vol. 2, iss. 4, 1990, pp. 490-501.

Wu, Huijia et al., "An empirical exploration of skip connections for sequential tagging", Proceedings of COLING 2016, the 26th International Conference on Computational Linguistics: Technical Papers, Osaka, Japan, Dec. 11-17, 2016., pp. 203-212.

Wu, Yonghui et al., "Google's neural machine translation system: Bridging the gap between human and machine translation", arXiv preprint, arXiv:1609.08144v2, Oct. 8, 2016, 23 pages.

Yu, Dong et al., "An Introduction to Computational Networks and the Computational Network Toolkit", Technical Report MSR, Microsoft Research, MSR-TR-2014-112, 2014, 150 pages.

Zaremba, Wojciech et al., "Recurrent neural network regularization", arXiv preprint arXiv:1409.2329, 2014, 8 pages.

Zhang, Yu et al., "Speech recognition with prediction-adaptation-correction recurrent neural networks", 2015 IEEE International Conference on Acoustics, Speech, and Signal Processing (ICASSP), 2015, pp. 5004-5008.

Zilly, Julian G. et al., "Recurrent highway networks", In Proceedings of the 34th International Conference on Machine Learning (ICML), arXiv:1607.03474v5, 2017, 12 pages.

Zoph, Barret et al., "Neural architecture search with reinforcement learning", arXiv preprint arXiv:1611.01578, Under review as a conference paper at ICLR 2017, 2016, 16 pages.

\* cited by examiner

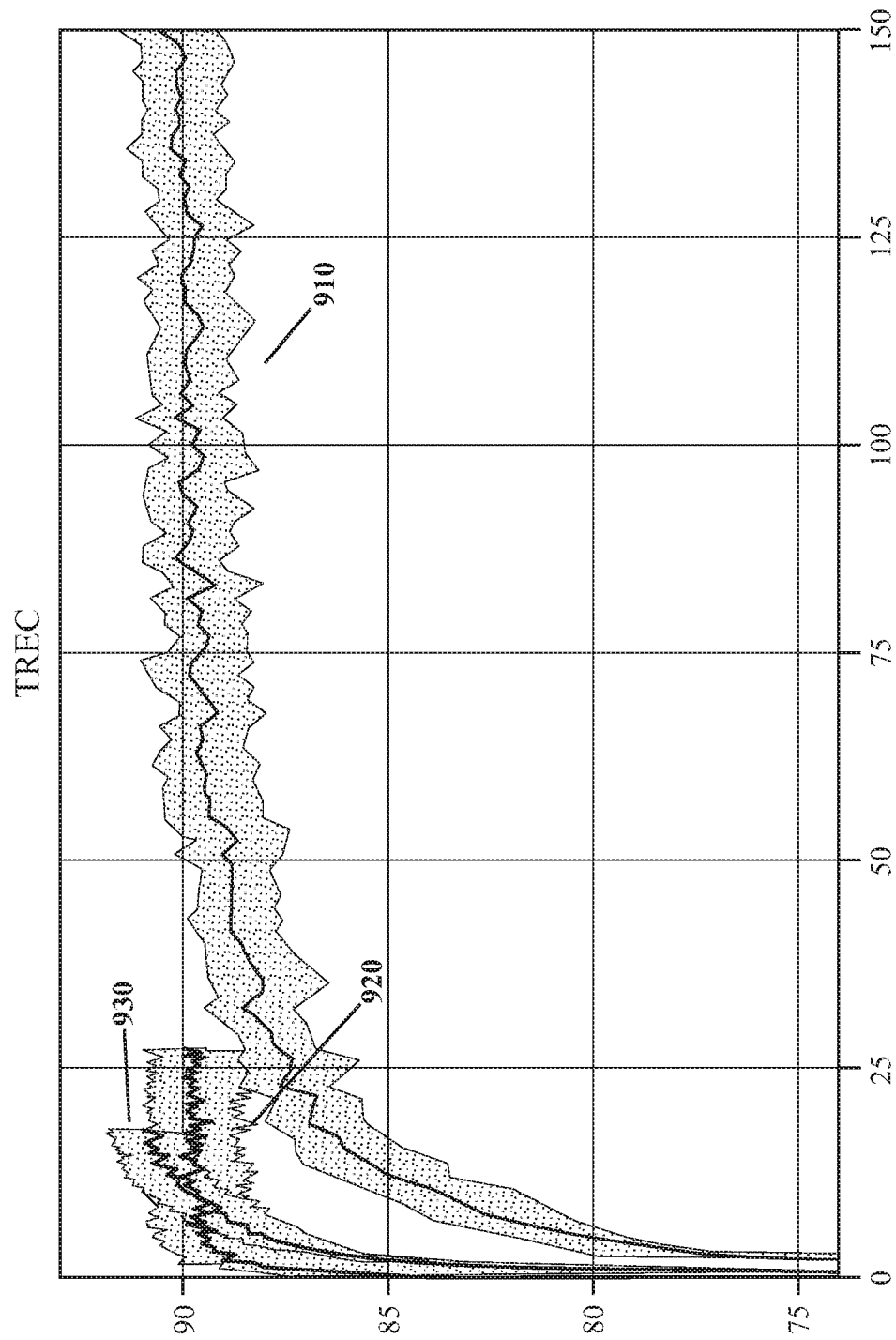

FAST NEURAL NETWORK IMPLEMENTATIONS BY INCREASING PARALLELISM OF CELL COMPUTATIONS

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

REFERENCE TO COMPUTER PROGRAM LISTING APPENDIX

A Computer Program Listing Appendix is submitted herewith electronically via EFS-Web, the files of which are incorporated herein by reference. The filename, size, and date for the files submitted include:
1. DrQA_README.txt, 1628 bytes, Sep. 25, 2017;
2. DrQA_download.txt, 537 bytes, Sep. 25, 2017;
3. DrQA_drqa_layers.txt, 9071 bytes, Sep. 25, 2017;
4. DrQA_drqa_model.txt, 5679 bytes, Sep. 25, 2017;
5. DrQA_drqa_rnn_reader.txt, 7594 bytes, Sep. 25, 2017;
6. DrQA_drqa_utils.txt, 1299 bytes, Sep. 25, 2017;
7. DrQA_prepro.txt, 12796 bytes, Sep. 25, 2017;
8. DrQA_train.txt, 14267 bytes, Sep. 25, 2017;
9. README.txt, 3371 bytes, Sep. 25, 2017;
10. classification_README.txt, 1652 bytes, Sep. 25, 2017;
11. classification_dataloader.txt, 7134 bytes, Sep. 25, 2017;
12. classification_modules.txt, 2761 bytes, Sep. 25, 2017;
13. classification_train_classifier.txt, 6760 bytes, Sep. 25, 2017;
14. cuda_functional_py.txt, 19394 bytes, Sep. 25, 2017;
15. language_model_README.txt, 1085 bytes, Sep. 25, 2017;
16. language_model_train_lm.txt, 8758 bytes, Sep. 25, 2017;
17. speech_BLSTM_5L.txt, 5681 bytes, Sep. 25, 2017;
18. speech_Bi-SRU_12L.txt, 7458 bytes, Sep. 25, 2017;
19. speech_CNTK_Bi-SRU.txt, 2349 bytes, Sep. 25, 2017;
20. speech_CNTK_Bi-SRU_smbr.txt, 2547 bytes, Sep. 25, 2017;
21. speech_CNTK_SRU.txt, 2237 bytes, Sep. 25, 2017;
22. speech_CNTK_SRU_smbr.txt, 2455 bytes, Sep. 25, 2017;
23. speech_LSTM_5L.txt, 7198 bytes, Sep. 25, 2017;
24. speech_README.txt, 971 bytes, Oct. 20, 2017;
25. speech_SRU_12L.txt, 3729 bytes, Sep. 25, 2017;
26. speech_make_fbank_pitch.txt, 1251 bytes, Sep. 25, 2017;
27. speech_run_bi-sru.txt, 7374 bytes, Sep. 25, 2017;
28. speech_run_sru.txt, 7029 bytes, Sep. 25, 2017; and
29. speech_run_swbd.txt, 9591 bytes, Sep. 25, 2017.

FIELD OF THE INVENTION

The present invention relates to fast implementations of artificial neural networks.

BACKGROUND

Advances in technology for implementing artificial neural networks have greatly increased their performance in a wide variety of applications, such as natural language processing, signal processing, image processing, or video processing. While the technology advances have improved the performance of neural networks in a variety of applications, they have also increased the amount time and computing resources need to train and implement neural networks. For some applications, training a neural network may take several days or longer. Speeding up the training and implementation of neural networks may improve the progress of research and development of applications of neural networks and also improve deployed applications that use neural networks.

BRIEF DESCRIPTION OF THE FIGURES

The invention and the following detailed description of certain embodiments thereof may be understood by reference to the following figures:

FIGS. 9A-9F illustrate the performance of a parallelized neural network on several classification tasks.

DETAILED DESCRIPTION

Figure 1:
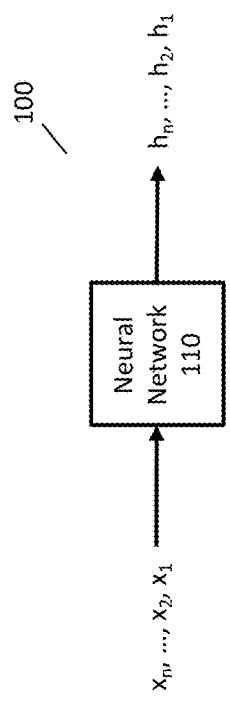
FIG. 1 is an example system where a neural network processes a sequence of inputs and generates a sequence of outputs.

Described herein are techniques for increasing the parallelism of artificial neural networks, which will be referred to herein as simply neural networks. A neural network is a mathematical model that is loosely based on the structure of neural networks in animal brains. Neural networks are typically structured as one or more layers of neurons, where each layer processes the outputs of neurons of a previous layer and whose outputs are processed by neurons of a subsequent layer. The processing of a layer may also include a non-linear process, such as computing a hyperbolic tangent, a sigmoid function, a softmax function, or a rectifier function. The non-linearities of a neural network allow the neural network to provide better performance than linear models.

Some neural networks, such as recurrent neural networks may be implemented as a sequence of cells, where the computations of a subsequent cell depend on one or more outputs of a previous cell. Because the computations of a cell depend on one or more outputs of a previous cell, at least some computations of a cell cannot be performed until the computations of a previous cell have completed. Accordingly, there are limitations to parallelizing the computations of the sequence of cells. Further, because cell computations may include computationally intensive matrix-vector multiplications, the inability to parallelize the cell computations causes the recurrent neural network to require significant computing resources.

Described herein are techniques for increasing the parallelization of cell computations of a neural network, thus increasing the computational efficiency for applications utilizing neural networks. In particular, computational efficiency may be increased by modifying the most demanding part of cell computations (matrix-vector multiplications) to allow those computationally demanding parts to be performed in parallel. The remaining parts of the cell computations that cannot be performed in parallel have lower computational demands, and thus the overall computation time may be significantly decreased. To obtain a neural network that allows for greater parallelization, the structure of the cell computations is modified. In particular, the computations for a cell are modified so that computationally intensive matrix-vector multiplications no longer depend on the previous cell. Modifying the structure of a neural network may also impact the performance of the neural network, but the experiments described below show that the modified neural network is not only more computationally efficient but also provides better performance in some applications.

The improved computational efficiency of the neural networks described herein provides numerous advantages. By allowing researchers to more quickly train neural network models, they are able see the results of their experiments sooner, try additional experiments more quickly, and thus more quickly advance progress in improving the state of the art in neural networks. Reducing computational demands for training neural networks allows for the training of neural networks with a larger amount of data and/or a larger number of parameters, which allows the creation of neural networks that perform better than neural networks trained with less data and/or fewer parameters. Reducing computational demands for training neural networks allows neural networks to be trained on a greater variety of computing devices, such as training a neural network on a personal computer instead of using cloud computing services. Reducing computational demands for training neural networks reduces the costs of training a neural network, such as when paying for cloud computing services. Reducing computational demands for implementing an application with a neural network allows the computation to be performed more quickly and thus providing an improved experience for the user of the application. Reducing computational demands for implementing an application with a neural network allows the application to be implemented on a greater number of devices, such as implementing a neural network on a mobile device or smartphone.

The techniques for increasing the parallelization of cell computations will be presented with the following example of a recurrent neural network:

$$\tilde{x}_t = W x_t \qquad (1)$$

$$f_t = \sigma(W_f x_t + R_f h_{t-1} + b_f) \qquad (2)$$

$$i_t = \sigma(W_i x_t + R_i h_{t-1} + b_i) \qquad (3)$$

$$r_t = \sigma(W_r x_t + R_r h_{t-1} + b_r) \qquad (4)$$

$$c_t = f_t \odot c_{t-1} + i_t \odot \tilde{x}_t \qquad (5)$$

$$h_t = r_t \odot g(c_t) + (1 - r_t) \odot x_t \qquad (6)$$

where $x_t$ is an input vector for cell t; $c_t$ is an internal state of cell t; and $h_t$ is the output of cell t where t ranges from 1 to n. When training a neural network, the sequence of $x_1$ to $x_n$ will be a sequence of training vectors. When implementing a trained neural network in an application, the sequence of $x_1$ to $x_n$ will be a sequence of input vectors to be processed for the application (e.g., vectors representing speech of a user to be converted to text using speech recognition).

For clarity of presentation, the input vector $x_t$, the internal state $c_t$, and the output vector $x_t$ will all have the same length, and this length is denoted as d. In other implementations, these vectors may have different lengths and the generalization to different lengths is straightforward to one of skill in the art.

In the above equations, W, $W_f$, $W_i$, $W_r$, $R_f$, $R_i$, and $R_r$ are each matrices of parameters of the neural network of size d by d, and $b_f$, $b_i$, and $b_r$ are each vectors of parameters of the neural network of length d. These parameters are initialized to default values and determined through a training process on a corpus of training data. In the above equations, σ indicates a sigmoid function, g indicates a hyperbolic tangent function, and ⊙ indicates an element-wise product.

The quantity $f_t$ may be referred to as the forget gate vector for cell t because it indicates an amount of information in the state received from the previous cell $c_{t-1}$ that should be forgotten in computing the current state. The quantity $i_t$ may be referred to as the input gate vector for cell t because it indicates an amount of information in the current input vector (or, as here, a transformed input vector denoted as $\tilde{x}_t$) that should be used in computing the current state. In some implementations, the input vector may instead be computed as $i_t = 1 - f_t$. The quantity $r_t$ may be referred to as the reset gate vector for cell t and indicates how to combine the current cell state and the input vector to determine the output of the cell.

Many variants of the above neural network are known to one of skill in the art, and the techniques described herein may also be applied to those neural network variants. For example, the above techniques may be applied to a bidirectional neural network. In particular, the dimensionality of the processed data may vary and, for example, matrices or tensors may be processed in place of vectors. As used herein, the terms vector and matrix may encompass any dimensionality of storing data and are not limited to one dimension and two dimensions, respectively.

FIG. 1 is an example system 100 where a neural network 110 receives a sequence of input vectors ($x_1$ to $x_n$), such as a sequence of training vectors, and outputs a sequence output vectors ($h_1$ to $h_n$). Neural network 110 may first process $x_1$ to output $h_1$, may then process $x_2$ to output $h_2$, and so forth. Neural network 110 may be any appropriate neural network, such as a recurrent neural network or the neural network described above. System 100 may be used to train a neural network (where the parameters of neural network 110 are updated) or may be used in an application of a neural network, such as performing speech recognition on speech of a user.

Figure 2:
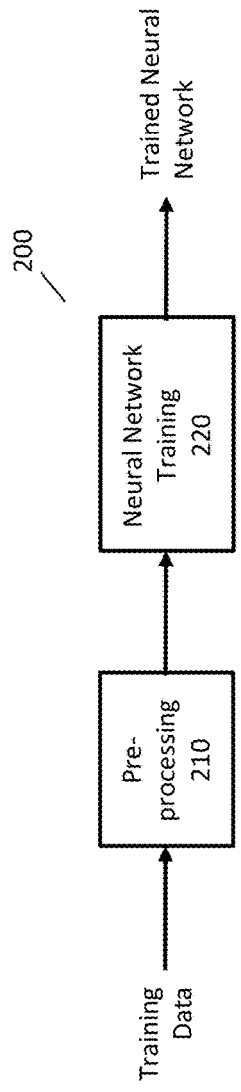
FIG. 2 is an example system for training a neural network.

FIG. 2 is an example system 200 for training a neural network. System 200 processes a corpus of training data and outputs a trained neural network. The corpus of training data may be any appropriate training data. For example, for training a neural network for performing speech recognition, the training data may comprise audio signals of speech and transcriptions of the speech in the audio signals. As an initial step in training a neural network, preprocessing component 210 may process the training data to put it in a more suitable form for training the neural network and any appropriate preprocessing may be applied. For example, for speech recognition, the audio signals may be processed to obtain a sequence of feature vectors (e.g., mel-frequency cepstral coefficients) that represent the audio signal. The sequence of training vectors may be created by preprocessing the training data. Neural network training component 220 may process the sequence of training vectors to train the parameters of the neural network. Any appropriate training procedures may be applied, such as back propagation or stochastic gradient descent.

Figure 3:
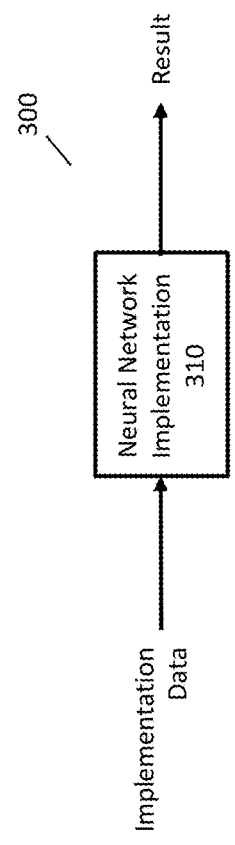
FIG. 3 is an example system for implementing an application that uses a neural network.

FIG. 3 is an example system 300 for implementing a neural network in an application, such the neural network trained by the system 200 of FIG. 2. In FIG. 3, neural network implementation component 310 receives application data and outputs a desired result by processing the application data with a neural network. For example, system 300 may correspond to a speech recognition service that receives audio of a user's speech and returns text of the speech.

Figure 4:
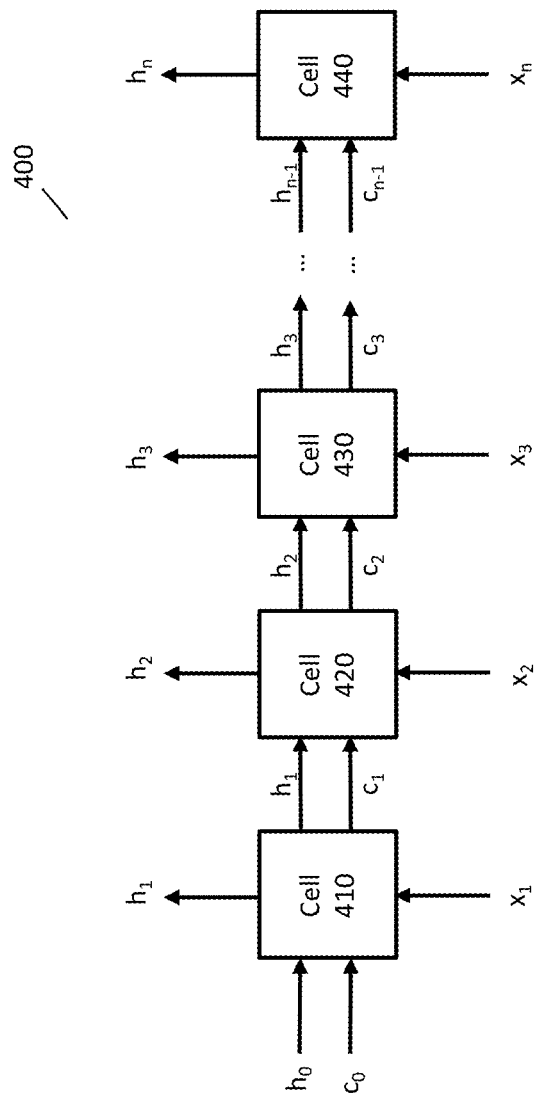
FIG. 4 is an example system showing a sequence of cell computations in a neural network.

FIG. 4 is an example system 400 showing additional details of a logical implementation of the neural network 110 of FIG. 1. In FIG. 4, the neural network is represented as a sequence of cells, starting with cells 410, 420, and 430, and ending with cell 440. Cell 410 receives the first input vector $x_1$ (e.g., a training vector or a vector from an application), an initial value for the state $c_0$, and an initial value for a previous output $h_0$. Cell 410 process these vectors to compute a state $c_1$ for the cell and a cell output $h_1$. For example, cell 410 may implement the equations set forth above.

Cell 420 performs similar process using the next input vector $x_2$, the state of cell 410 $c_1$, and the output of cell 410 $h_1$ to compute the state of cell 420 $c_2$ and the output of cell 420 $h_2$. Cell 430 also performs similar processing using the next input vector $x_3$, the state of cell 420 $c_2$, and the output of cell 420 $h_2$ to compute the state of cell 430 $c_3$ and the output of cell 430 $h_3$. This process may be repeated until a final cell, such as cell 440, processes a final input vector $x_n$, a state vector of a previous cell $c_{n-1}$, and an output vector of the previous cell $h_{n-1}$ to compute a state of cell 440 $c_n$ and an output of cell 440 $h_n$. One or more of the cell outputs may be used to train the neural network or may be used in an application. For example, the final cell output $h_n$ may be a vector whose length is the size of a speech recognition vocabulary, and a largest element of this vector may be used to select a word from the vocabulary (e.g., a word that is part of a speech recognition result).

Figure 5:
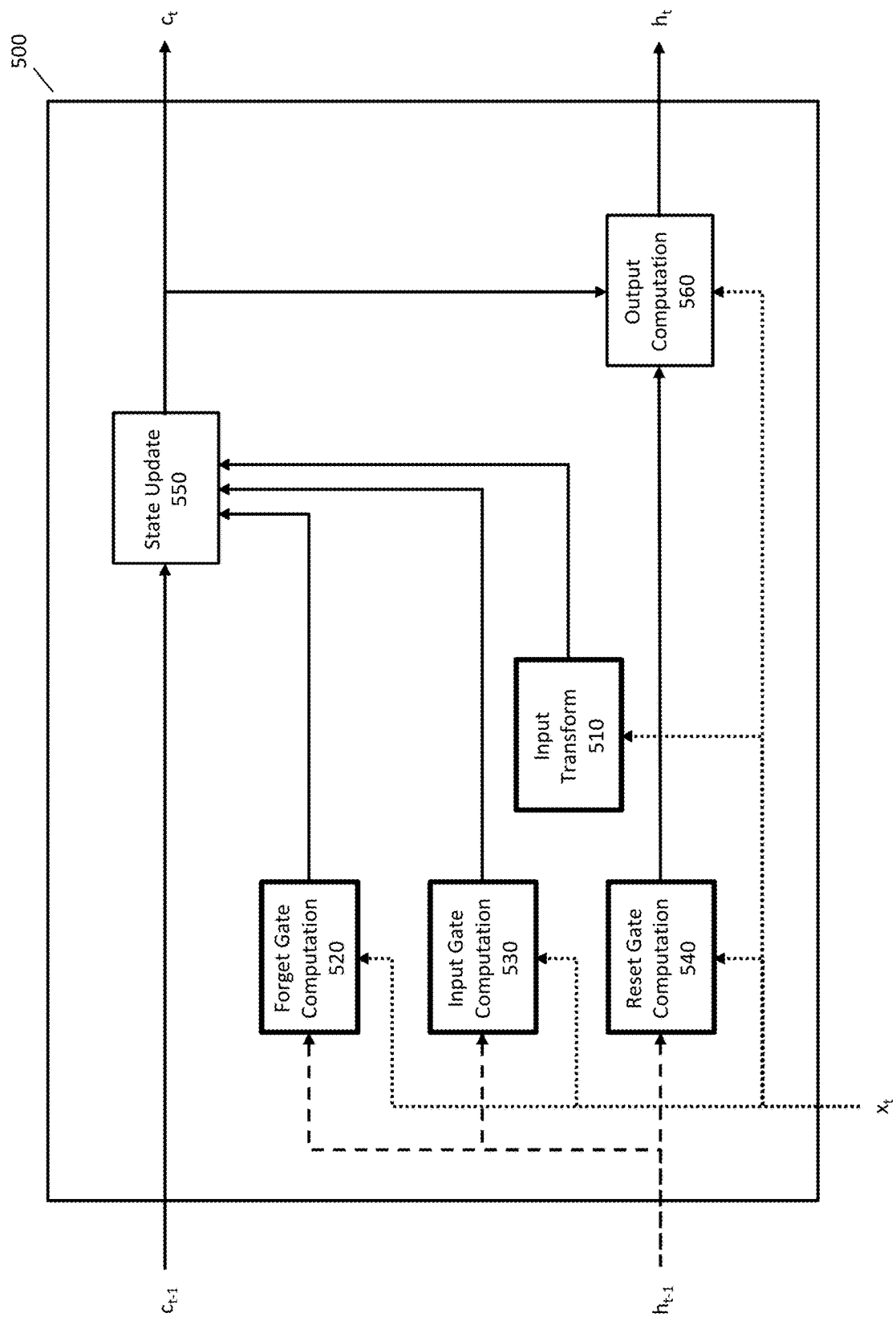
FIG. 5 illustrates computations of a neural network cell.

FIG. 5 illustrates additional details of an example implementation of a neural network cell 500, such as a neural network described by the equations above. As above, cell 500 receives input vector $x_t$, the state of the previous cell $c_{t-1}$, and an output of the previous cell $h_{t-1}$. Cell 500 processes these inputs to compute a cell state $c_t$ and an output vector $h_t$. For clarity of presentation, the data paths for processing the input vector $x_t$ are shown with dotted lines and the data paths for processing the output of the previous cell $h_{t-1}$ are show with dashed lines, but the dotted and dashed lines do not have any other significance.

The components of cell 500 perform computations, such as the computations described by the equations above. For example, input transform component 510 may perform computations described by equation (1), forget gate computation component 520 may perform computations described by equation (2), input gate computation component 530 may perform computations described by equation (3), reset gate computation component 540 may perform computations described by equation (4), state update component 550 may perform computations described by equation (5), and output computation component 560 may perform computations described by equation (6). In FIG. 5, input transform component 510 and the three gate computation components are shown in bold because they perform computationally intensive matrix-vector multiplication operations. Because the three gate computation components depend on the output of the previous cell, these computations cannot be performed in parallel with computations for other cells. If these computations could be performed in parallel, the overall computation time for the neural network could be decreased.

To increase the parallelization of the neural network, the neural network equations presented above may be modified to enable additional parallelization of computations. In particular, the neural network may be modified as described by the following equations:

$$\tilde{x}_t = W x_t \tag{7}$$

$$f_t = \sigma(W_f \tilde{x}_t + b_f) \tag{8}$$

$$i_t = \sigma(W_i \tilde{x}_t + b_i) \tag{9}$$

$$r_t = \sigma(W_r \tilde{x}_t + b_r) \tag{10}$$

$$c_t = f_t \odot c_{t-1} + i_t \odot \tilde{x}_t \tag{11}$$

$$h_t = r_t \odot g(c_t) + (1 - r_t) \odot x_t \tag{12}$$

wherein the notations are as described above for equations (1)-(6).

A key difference between the neural network defined by equations (1)-(6) and the neural network described by equations (7)-(12) is that, in the latter, the three gate computations no longer depend on the previous cell of the neural network. Because the gate computations do not depend on the previous cell, the gate computations may be performed in parallel and this allows the computation time of the neural network to be reduced. The matrices $W_f$, $W_i$, and $W_r$ may each be referred to as a gate matrix of the corresponding gates.

Figure 6:
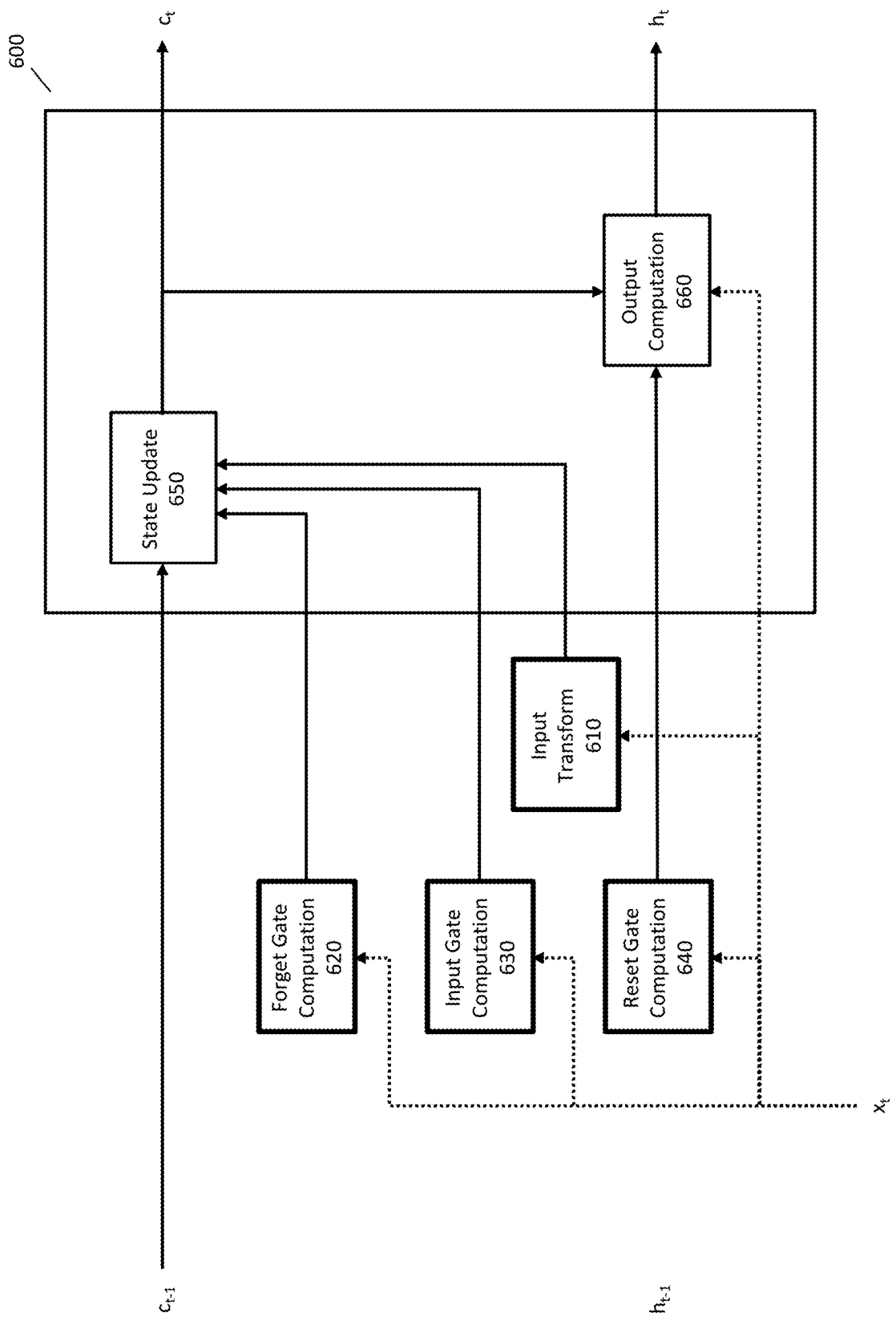
FIG. 6 illustrates computations of a neural network cell where additional computations may be parallelized.

FIG. 6 illustrates details of a neural network cell 600 as described by equations (7)-(12). The components of FIG. 6 are similar to the components of FIG. 5 except that now the components are implemented according to equations (7)-(12). For example, input transform component 610 may perform computations described by equation (7), forget gate computation component 620 may perform computations described by equation (8), input gate computation component 630 may perform computations described by equation (9), reset gate computation component 640 may perform computations described by equation (10), state update component 650 may perform computations described by equation (11), and output computation component 660 may perform computations described by equation (12).

In FIG. 6, input transform component 610 and the three gate computation components no longer depend on the output of the previous cell. Because these computations no longer depend on the computations of the previous cell, they can be removed entirely from cell 600 as illustrated in FIG. 6. Further, these computations may be performed before any cell computations are started, and thus these computations may now be performed in parallel. The remaining computations in cell 600 do not include any matrix-vector multiplications and thus the remaining computations in cell 600 require less time and computing resources.

In some implementations, the matrix-vector multiplications of equations (7)-(10) for all cells (for t from 1 to n) may be computed with a single matrix-matrix multiplication as follows:

$$P = \begin{bmatrix} W \\ W_f \\ W_i \\ W_r \end{bmatrix} [x_1 x_2 \ldots x_n]$$

The matrices W, $W_f$, $W_i$, and $W_r$ may be combined or concatenated into a single matrix of size 4d by d. The input vectors $x_1$ to $x_n$ may be combined into a single matrix of size d by n. As a result, the matrix P includes the results of all the matrix-vector multiplications for all the cells. The matrix P may be visualized as $$P = \begin{bmatrix} Wx_1 & Wx_2 & \ldots & Wx_n \\ W_f x_1 & W_f x_2 & \ldots & W_f x_n \\ W_i x_1 & W_i x_2 & \ldots & W_i x_n \\ W_r x_1 & W_r x_2 & \ldots & W_r x_n \end{bmatrix}$$

Accordingly, the first column provides the matrix-vector multiplications for the first cell, the second column provides the matrix-vector multiplications for the second cell, and so forth.

Because all the matrix-vector multiplications can be performed with a single matrix-matrix multiplication, it is straightforward to parallelize the computations of the matrix-matrix multiplication. For example, the matrix-matrix multiplication may be performed on a graphics processing unit (GPU) with multiple processors or cores and multiple threads. For example, the matrix-matrix multiplication may be implemented using Nvidia's CUDA platform with a single CUDA kernel.

In some implementations, computing the precomputed data may include performing other operations in addition to the matrix-matrix multiplication. For example, computing the precomputed data may include computing the gate vectors, and the precomputed data may be represented as:

$$P = \begin{bmatrix} \tilde{x}_1 & \tilde{x}_2 & \ldots & \tilde{x}_n \\ f_1 & f_2 & \ldots & f_n \\ i_1 & i_2 & \ldots & i_n \\ r_1 & r_2 & \ldots & r_n \end{bmatrix}$$

Figure 7:
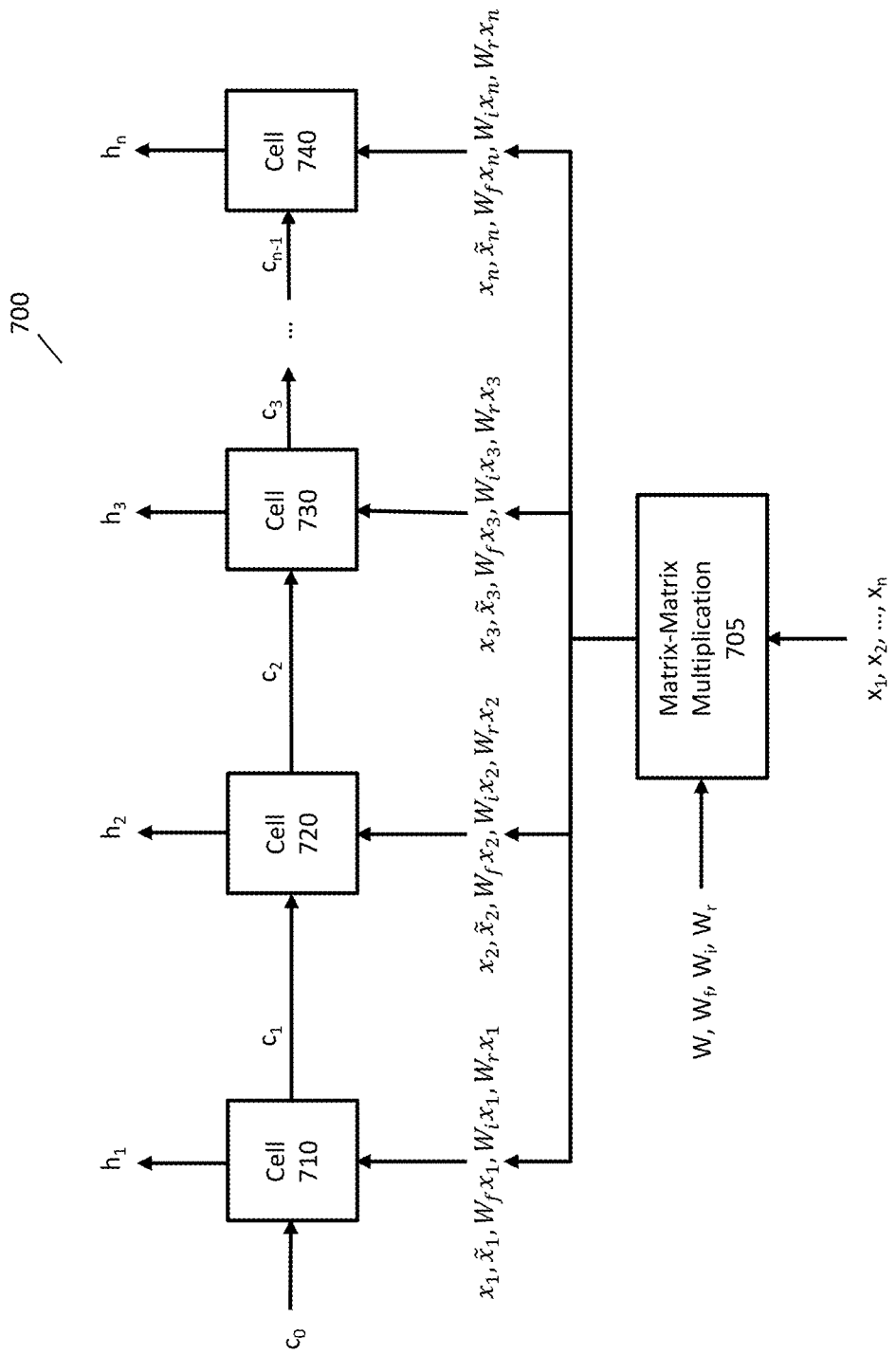
FIG. 7 is an example system showing a sequence of cell computations in a neural network where additional computations may be parallelized.

FIG. 7 is an example system 700 showing details of a logical implementation of a neural network using the cell of FIG. 6. As in FIG. 4, the neural network is represented as a sequence of cells, but the cells are implemented using the cell of FIG. 6 instead of the cell of FIG. 5. In FIG. 7, the neural network starts with cells 710, 720, and 730, and ends with cell 740.

In FIG. 7, matrix-matrix multiplication component 705 performs the matrix-matrix multiplication described above. In particular, matrix-matrix multiplication component 705 obtains a first matrix that is a combination of W, $W_f$, $W_i$, and $W_r$, obtains a second matrix that is a combination of the input vectors, and then multiplies the two matrices to compute a matrix that is referred to herein as the precomputed matrix. Each of the cells then receives a portion of the precomputed matrix to perform the computations needed for the cell.

Cell 710 receives an initial state vector, the first input vector $x_1$ and the portions of the precomputed matrix corresponding to $\tilde{x}_1$, $W_f x_1$, $W_i x_1$, and $W_r x_i$. Cell 710 then computes the state vector for the cell $c_1$ and the cell output $h_1$. Cell 720 receives the state vector of the previous cell $c_1$, the second input vector $x_2$, and the portions of the precomputed matrix corresponding to $\tilde{x}_2$, $W_f x_2$, $W_i x_2$, and $W_r x_2$. Cell 720 then computes the state vector for the cell $c_2$ and the cell output $h_2$. This process continues for the remaining cells until computations are performed for the final cell, cell 740.

The cell computations of FIG. 7 may also be parallelized. As above, the cell computations for the cells may be performed on a graphics processing unit (GPU) with multiple processors or cores and multiple threads. For example, the computations for all of the cells (cell 710 through 740) may be implemented using Nvidia's CUDA platform with a single CUDA kernel.

In some implementations, matrix-matrix multiplication component 705 may perform additional computations. For example, matrix-matrix multiplication component 705 may perform additional computations for the gate vectors or may compute the gate vectors by performing all of the computations of equations (8)-(10). For example, cell 710 may receive as input an initial state vector, the first input vector $x_1$, and $\tilde{x}_1$, $f_1$, $i_1$, and $r_1$.

In some implementations, a neural network may be trained using mini-batches of training data, and the techniques described above may be further adapted to improve parallelization over the mini-batch of training data. A mini-batch of training data may include m sequences of input vectors. For example, a first sequence of input data may be denoted as $x_{1,1}, x_{1,2} \ldots x_{1,n_1}$; a second sequence of input data may be denoted as $x_{2,1}, x_{2,2} \ldots x_{2,n_2}$; and an $m^{th}$ sequence of training data may be denoted as $x_{m,1}, x_{m,2} \ldots x_{m,n_m}$, where $n_1$ is the length of the first sequence, $n_2$ is the length of the second sequence, and $n_m$ is the length of the $m^{th}$ sequence. The matrix-vector multiplications for the entire mini-batch may be computed with a single matrix-matrix multiplication as follows:

$$P = \begin{bmatrix} W \\ W_f \\ W_i \\ W_r \end{bmatrix} [x_{1,1} \ldots x_{1,n_1} \; x_{2,1} \ldots x_{2,n_2} \ldots x_{m,1} \ldots x_{m,n_m}]$$

Cell computations may then be performed for each input vector of the mini-batch as described above. The cell computations for the mini-batch may also be parallelized. As above, the cell computations for the mini-batch may be performed on a graphics processing unit (GPU) with multiple processors or cores and multiple threads. For example, the cell computations for the entire mini-batch may be implemented using Nvidia's CUDA platform with a single CUDA kernel.

In some implementations, the techniques described herein for computing a neural network for a mini-batch of input data may be implemented by pseudo code shown below. In this example, the input gate is set to $i_t = 1 - f_t$ to simplify the computations. Denote the input data as x[l, i, j], where l ranges from 1 to n with n being the length of the longest input sequence of the mini-batch (shorter sequences may be zero padded), i ranges from 1 to k with k being the number of input sequences in the mini-batch, and j ranges from 1 to d where d is the length of each input vector (and the state and output vectors of each cell).

A three-dimensional matrix U may be computed as $$U^T = \begin{bmatrix} W \\ W_f \\ W_r \end{bmatrix} x$$

where x is described above. The matrix U may be denoted as u[l, i, j'], where l and i range as indicated above, and j' ranges from 1 to 3d. A vector $b_f$[j] is used for the forget gate computation, a vector $b_r$[j] is used for the reset get computation, and a matrix $c_0$ [i, j] is used to initialize the states of the cells. To store the computed states for each cell and the outputs of each cell the matrices h[l, i, j] and c[l, i, j] are initialized.

A neural network may then be implemented as described by the following pseudo code:

```
for i = 1, ..., k; j = 1, ..., d do
    c = c₀[i, j]
    for l = 1, ..., n do
        f = σ(U[l, i, j + d] + b_f[j])
        r = σ(U[l, i, j + 2×d] + b_r[j])
        c = f×c + (1 − f)×U[l, i, j]
        h = r×g(c) + (1 − r)×x[l, i, j]
        c[l, i, j] = c
        h[l, i, j] = h
    endfor
endfor
return c, h
```

The results of the computations may then be used for training the neural network or implementing an application with a neural network as described above.

Figure 8:
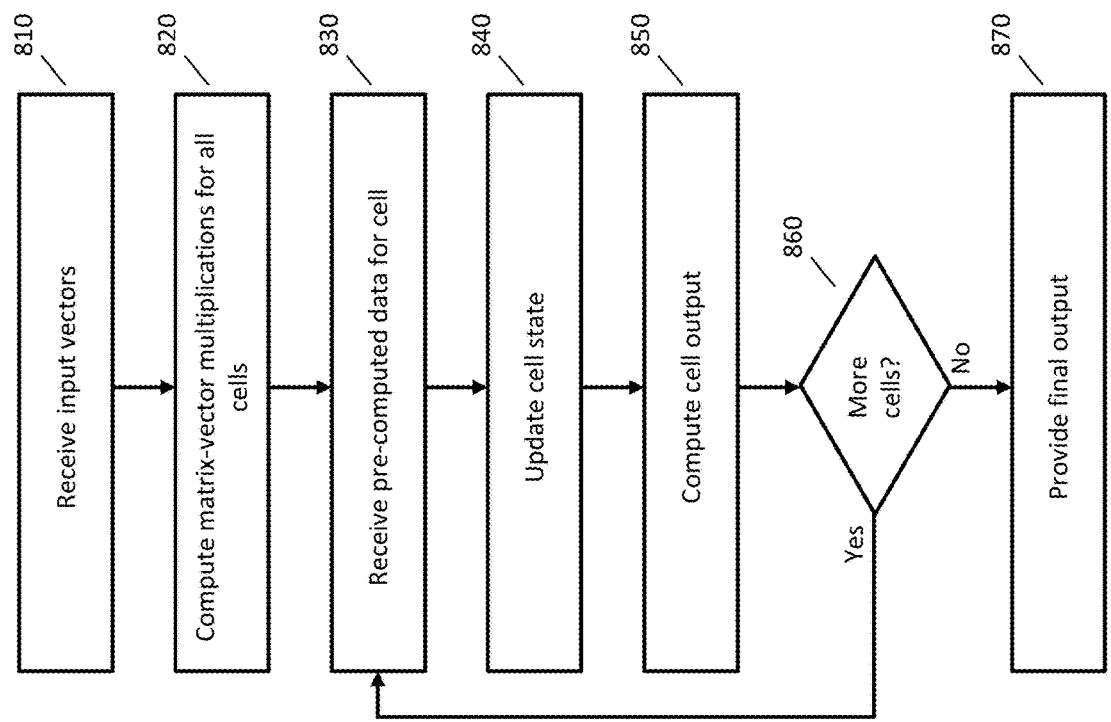
FIG. 8 is a flowchart of an example implementation of a neural network with parallelized matrix-vector computations.
Figure 9A:
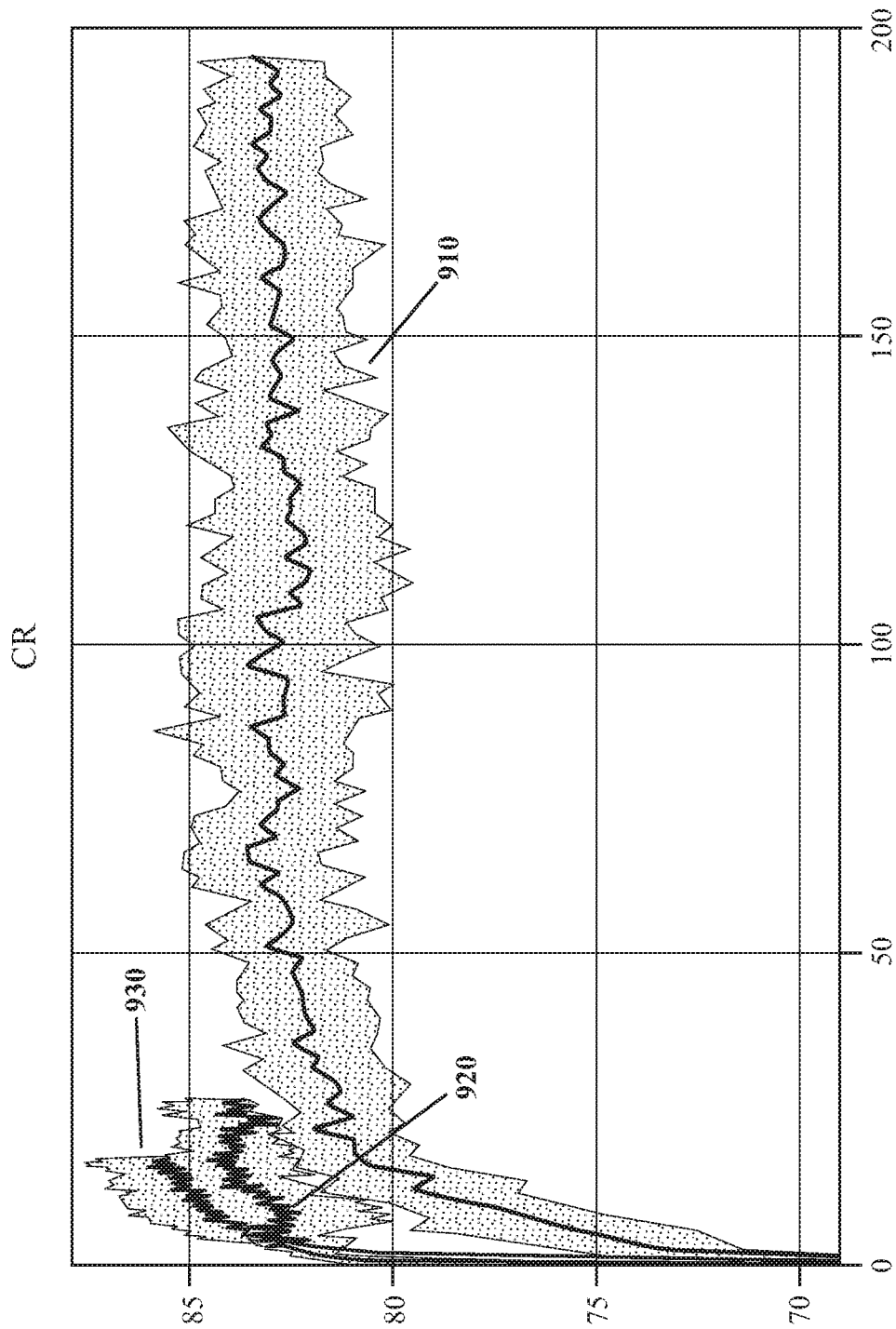
Figure 9C:
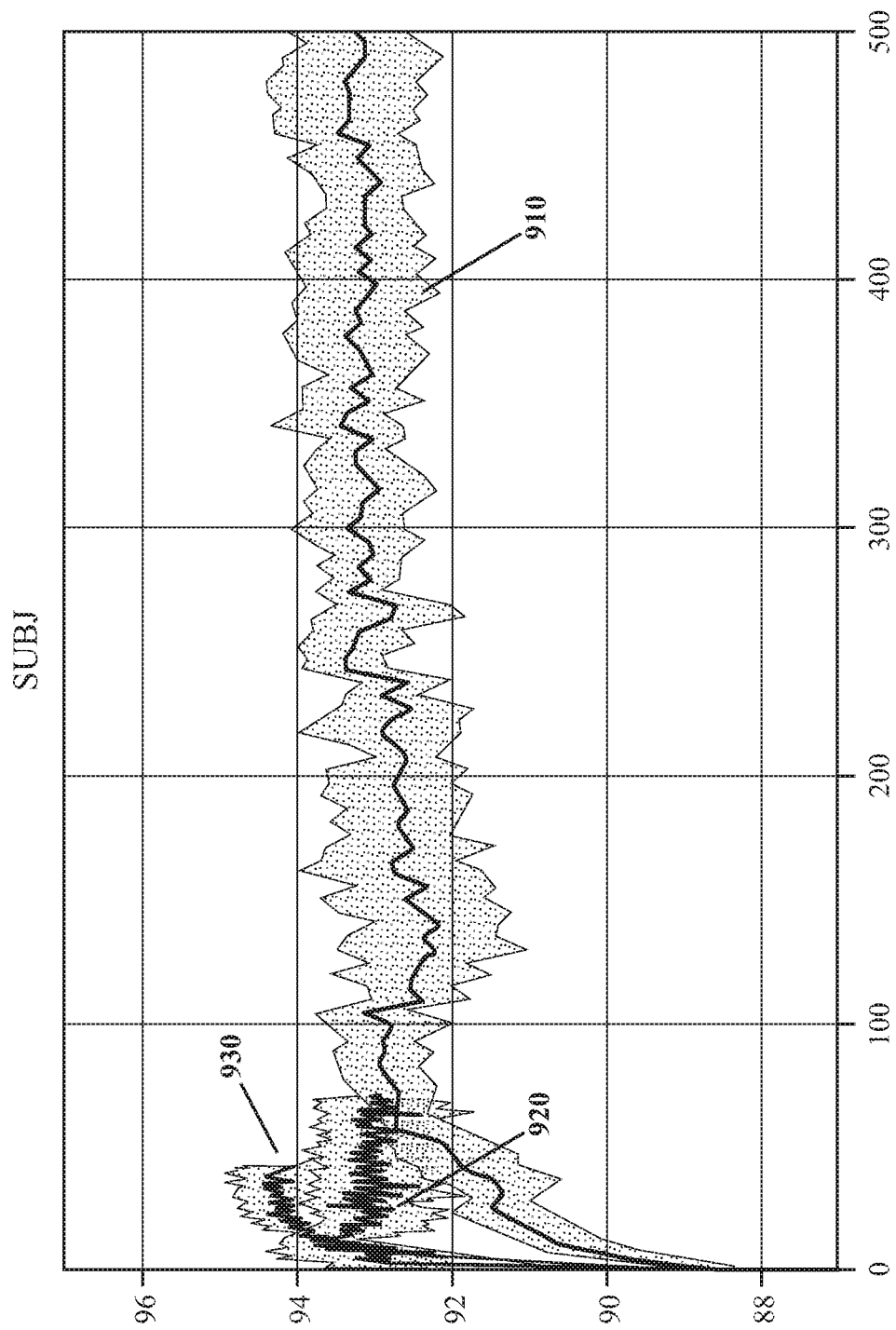
Figure 9D:
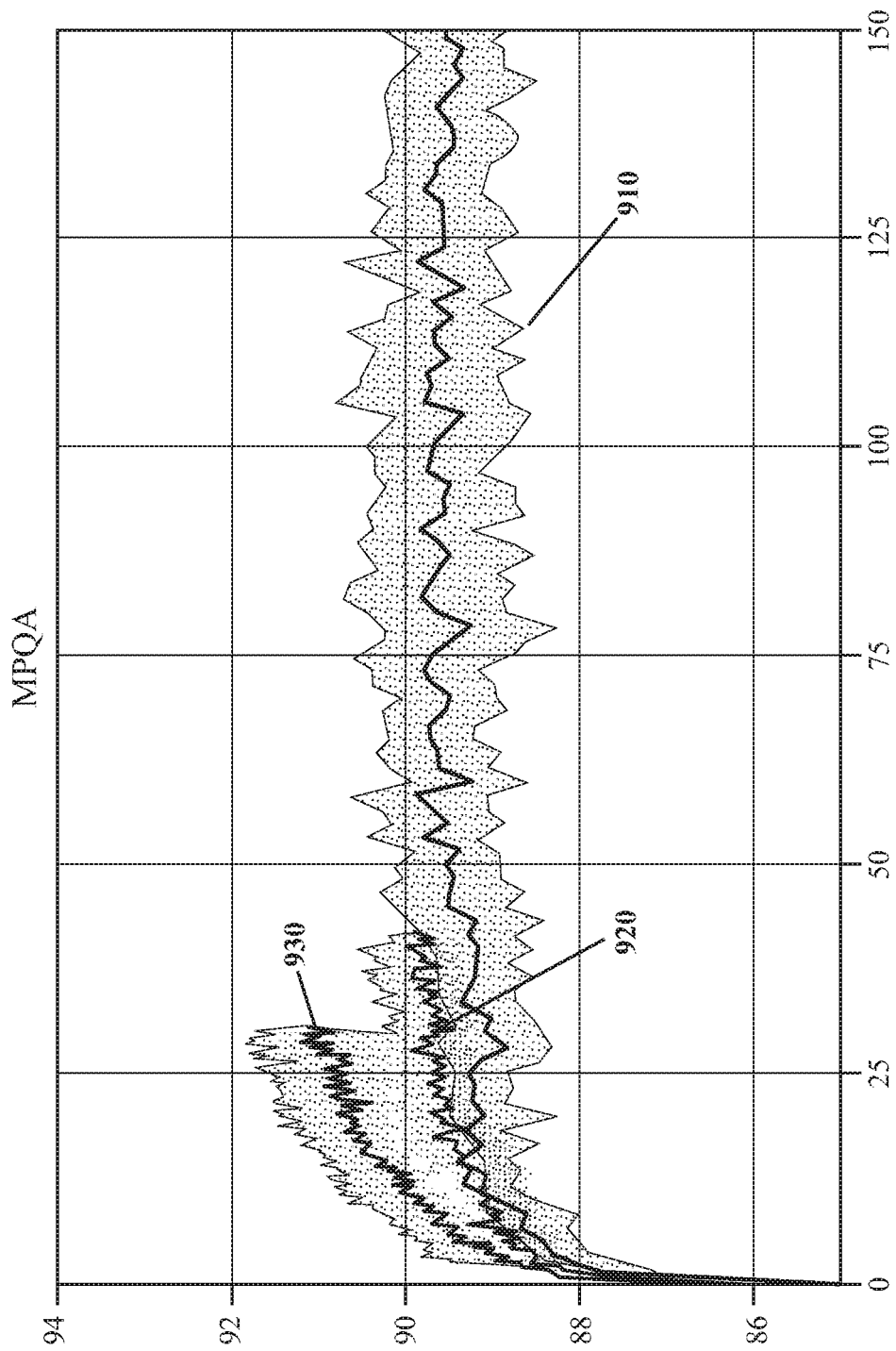
Figure 9E:
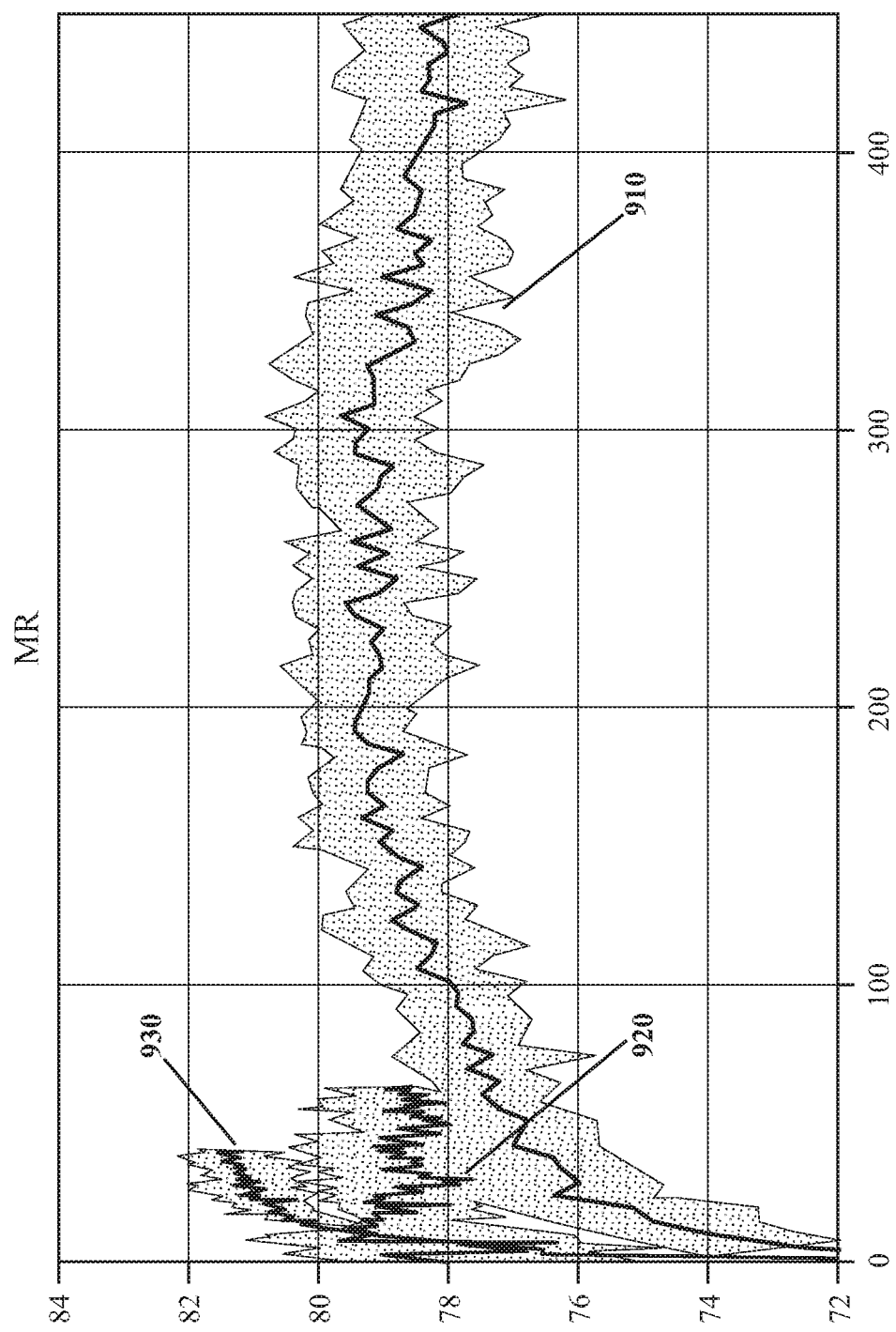
Figure 9F:
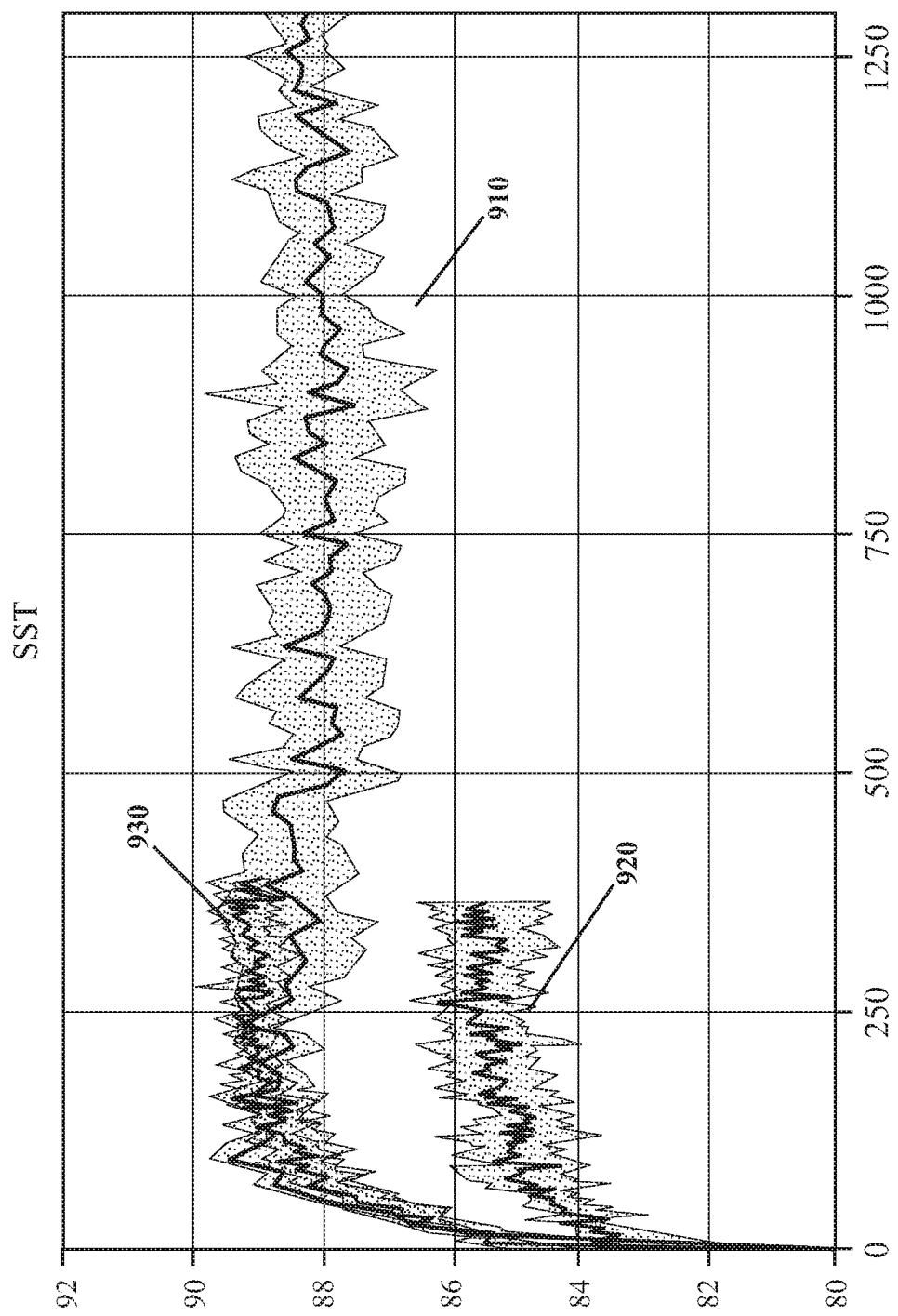

FIG. 8 is a flowchart of an example implementation of parallelizing computations for a neural network as described above. In FIG. 8, the ordering of the steps is exemplary and other orders are possible, not all steps are required, and, in some implementations, some steps may be omitted or other steps may be added. The process of the flowchart may be implemented, for example, by any of the computers or systems described herein.

For clarity of presentation, some of the data used by the processing of FIG. 8 will be referred to as a vector, such as an input vector, state vector, or output vector. This data need not be in the form of a vector and may be stored in any appropriate form, such as a matrix or a tensor. As used herein, a vector comprises any format of storing data, and the data does not need to be stored in the form of a vector.

At step 810, input vectors are received for processing by a neural network. For example, the input vectors may correspond to sequence of training vectors for training a neural network or to a sequence of input vectors from an application of the neural network. In some implementations, an entire sequence of input vectors may be received in a single transmission, and in some implementations, the input vectors may be received in different transmissions, such as when processing a stream of input vectors. In some implementations, the input vectors may correspond to a mini-batch of data, such as a multiple input sequences from a training corpus.

At step 820, the matrix-vector computations for all cells of the neural network are performed. For example, the matrix-vector computations may correspond to a transformation of the input vector (e.g., as in equation (7)) or may correspond to a step in computing a gate vector of a gate (e.g., the matrix-vector computations of equations (8)-(10)).

As used herein, a gate of a neural network corresponds to a sequence of operations comprising multiplying an input vector by a matrix and applying a non-linear function (and possibly performing other operations, such as the addition in equations (8)-(10)). The matrix being multiplied during a gate computation may be referred to as a gate matrix. The output of a gate computation of a neural network may be referred to as a gate vector. In some implementations, the output of the non-linear function will always be between 0 and 1, and the elements of the gate vector will always be between 0 and 1.

In some implementations, a first matrix may be obtained by combining a matrix of an input vector transformation and/or one or more gate matrices from one or more gates, a second matrix may be obtained by combining the input vectors (e.g., training vectors), and the first and second matrices may be multiplied to effectively compute all the matrix-vector calculations in a single operation. In some implementations, step 820 may be performing in parallel using a GPU with multiple cores, processors, and/or threads and/or using a single CUDA kernel. In some implementations, additional computations may be performed during this step, such as computing gate vectors from the results of the matrix-vector multiplications. The output of the computations of step 820 is referred to herein as precomputed data.

At step 830, data is obtained for performing computations for a cell. For example, a first iteration of step 830 may correspond to a first cell, a second iteration of step 830 may correspond to a second cell, and so forth. The data received at step 830 may include an input vector (e.g., a first input vector for a first cell), a state vector received from a previous cell (or an initial value for the first cell), a portion of the precomputed data computed at step 820, and any other data that may be used for the cell computations. For example, the precomputed data may include the output of matrix-vector multiplications or computed gate vectors. As used herein, cell computations for a cell comprise any computations that include processing an input vector (and possibly a state vector from a previous cell) to compute a state vector for the cell and an output vector for the cell.

At step 840, a state vector is computed for the cell using the data received at step 830. Any appropriate computations may be performed at step 840, such as the computations described by equation (11).

At step 850, an output vector is computed for the cell using the data received at step 830 and/or the state vector computed at step 840. Any appropriate computations may be performed at step 850, such as the computations described by equation (12).

At step 860 it is determined if computations need to be performed for additional cells, such as if any input vectors remain to be processed. If additional cell computations are to be performed, then processing proceeds to step 830 where steps 830, 840, and 850 are performed for the subsequent cell. If no additional cell computations are to be performed, then processing proceeds to step 870 where a final output is provided. For example, the output vectors and/or the state vectors of one or more cells may be provided to another stage of processing.

The processing of FIG. 8 may correspond to training a neural network or to an implementation of a neural network in an application. Where the processing of FIG. 8 corresponds to training a neural network, the input vectors correspond to training data, and the trained neural network may then be deployed in an application, such as any of the applications described herein. Where the processing of FIG. 8 corresponds to an implementation of a neural network in an application, the input vectors correspond to data received by the application for processing (e.g., text or speech received from a user.) Where the neural network is used in an application, data is received from a user (such as text or speech), a sequence of input vectors may be computed from the received data, the sequence of input vectors may be processed with the neural network to generate a result (e.g., speech recognition or translation), and the result may be provided to a device for presentation to the user.

Experiments

The techniques described above illustrate how neural network calculations may be performed in parallel to speed up computations. The parallelized neural network described above is now referred to as a parallelized neural network or PNN. For PNN to be practically useful, it should provide improved computation time in practice and should also provide comparable performance to the unparallelized neural networks. Results of several experiments are now presented showing practical improvements in computation time and also comparable or even improved performance in some situations. The experiments below are implemented using software similar to the software provided in the Computer Program Listing Appendix.

PNN is evaluated on a diverse set of benchmarks. These benchmarks are chosen to have a broad coverage of application scenarios and computational difficulties. Specifically, models are trained for text classification, question answering, language modeling, machine translation, and speech recognition tasks. Training time on these benchmarks ranges from a couple of minutes (for classification) to several days (for speech).

The experiments below investigate whether PNN achieves better results and better performance-speed trade-off compared to other alternatives. To this end, multiple layers of PNN are stacked as a direct substitute of other recurrent (or convolutional) modules in a model. Hyperparameter tuning and architecture engineering are minimized for a fair comparison with prior work, since such effort has a non-trivial impact on the results. The model configurations are made mostly consistent with prior work.

Classification

Dataset: Six classification datasets from (Kim, Yoon, "Convolutional neural networks for sentence classification.", Proceedings of the Empirical Methods in Natural Language Processing (EMNLP), pp. 1746-1751, 2014, hereinafter "Kim, 2014") are used: movie reviews (MR) (Pang, Bo and Lillian Lee, "Seeing stars: Exploiting class relationships for sentiment categorization with respect to rating scales.", Proceedings of the 43$^{rd}$ annual meeting on association for computational linguistics.", pp. 115-124. Association for Computational Linguistics, 2005), subjectivity data (SUBJ) (Pang, Bo and Lillian Lee, "A sentimental education: Sentiment analysis using subjectivity summarization based on minimum cuts." Proceedings of the 42$^{nd}$ annual meeting on Association and Computational Linguistics, pp. 271-278, Association for Computational Linguistics, 2004), customer reviews (CR) (Hu, Minqing and Bing Liu, "Mining and summarizing customer reviews." Proceedings of the Tenth ACM SIGKDD International Conference on Knowledge Discovery and Data Mining, pp. 168-177, ACM, 2004), TREC questions (Li, Xin and Dan Roth, "Learning question classifiers." Proceedings of the 19th International Conference on Computational Linguistics—Volume 1, 7 pages, Association for Computational Linguistics, 2002), opinion polarity from MPQA data (Wiebe et al., "Annotating expressions of opinions and emotions in language." Language Resources and Evaluation, vol. 39, iss. 2-3, pp. 165-210, 2005) and Stanford sentiment treebank (SST) (Socher et al., "Recursive deep models for semantic compositionality over a sentiment treebank." Proceedings of the 2013 Conference on Empirical Methods in Natural Language Processing, pp. 1631-1642, October 2013). All these datasets contain several thousand annotated sentences. Word2vec embeddings trained on 100 billion tokens from Google News are used, following (Kim, 2014). The word vectors are normalized to unit vectors and are fixed during training.

Setup: RNN encoders are trained and the last hidden state is used to predict the class label for a given input sentence. For most datasets, a 2-layer RNN encoder with 128 hidden dimensions suffices to produce good results. Four-layer RNNs from the SST dataset may be used since the amount of annotation is an order of magnitude larger than other datasets. In addition, the same convolutional neural network (CNN) model of (Kim, 2014) is trained under the same settings as a reference. The filter widths and number of filters used are the same as (Kim, 2014). All models are trained using default Adam optimizer with a maximum of 100 epochs. Dropout probability is tuned among {0.1, 0.3, 0.5, 0.7} and the best results are reported.

Results: Table 1 presents the test accuracy on the six benchmarks. PNN achieves better accuracy consistently across the datasets. PNN also processes data significantly faster than cuDNN LSTM (an LSTM implemented using the CUDA deep neural network library). Table 1 shows test accuracies on classification benchmarks. Wide CNNs refer to the sentence convolutional model (Kim, 2014) using 3, 4, 5-gram features (i.e. filter width 3, 4, 5). 10-fold cross validation is performed when there is no standard train-dev-test split. The result on SST is averaged over 5 independent trials. All models are trained using Adam optimizer with default learning rate=0.001 and weight decay=0.

FIGS. 9A-9F plot the validation curves of PNN, cuDNN LSTM and the wide CNNs of (Kim, 2014). In FIGS. 9A-9F, cuDNN LSTM results are shown by 910, CNN results are shown by 920, and PNN results are shown by 930. On the movie review dataset for instance, PNN completes 100 training epochs within 40 seconds, while cuDNN LSTM takes more than 450 seconds. FIGS. 9A-9F show mean validation accuracies (y-axis) of LSTM, CNN and PNN for the first 100 epochs on 6 classification benchmarks. The X-axis shows training time in seconds relative to the first iteration. Timings are performed on PyTorch and a desktop machine with a single Nvidia GeForce GTX 1070 GPU, Intel Core i7-7700K Processor, CUDA 8 and cuDNN 6021.

TABLE 1

| Model | CR | SUBJ | MR | TREC | MPQA | SST |
|---|---|---|---|---|---|---|
| Wide CNNs | 82.2 ± 2.2 | 92.9 ± 0.7 | 79.1 ± 1.5 | 93.2 ± 0.5 | 88.8 ± 1.2 | 85.3 ± 0.4 |
| cuDNN LSTM | 82.7 ± 2.9 | 92.4 ± 0.6 | 80.3 ± 1.5 | 93.1 ± 0.9 | 89.2 ± 1.0 | 87.9 ± 0.6 |
| PNN | 84.8 ± 1.3 | 93.4 ± 0.8 | 82.2 ± 0.9 | 93.9 ± 0.6 | 89.7 ± 1.1 | 89.1 ± 0.3 |

Question Answering

Dataset: The Stanford Question Answering Dataset (SQuAD) (Rajpurkar et al., "SQuAD: 100,000+ questions for machine comprehension of text." Proceedings of the 2016 Conference on Empirical Methods in Natural Language Processing (EMNLP), pp. 2383-2392, 2016) is used as a benchmark. It is one of the largest machine comprehension datasets, consisting over 100,000 question/answer pairs extracted from Wikipedia articles. The standard train and dev sets provided on the official website are used.

Setup: The Document Reader model as described in (Chen et al., "Reading Wikipedia to answer open-domain questions." Proceedings of the 55th Annual Meeting of the Association for Computational Linguistics, pp. 1870-1879, Association for Computational Linguistics, 2017, hereinafter "Chen et al., 2017") is trained and the model variants which use LSTM (original setup) and PNN are compared. The open source PyTorch re-implementation of the Document Reader model is used. Due to minor implementation differences, this version obtains 1% worse performance compared to the results reported in (Chen et al., 2017) when using the same training options. Following the suggestions of the authors, a smaller learning rate (0.001 instead of 0.002 for Adamax optimizer) is used and the dropout rates of word embeddings and RNNs are retuned. This gives results comparable to the original paper. All models are trained for a maximum of 50 epochs, batch size 32, a fixed learning rate of 0.001, and a hidden dimension of 128. A dropout of 0.5 is used for input word embeddings, 0.2 for PNN layers, and 0.3 for LSTM layers.

Results: Table 2 summarizes results on SQuAD. LSTM models achieve 69.6% exact match and 78.9% F1 score, being on par with the results in the original work (Chen et al., 2017). PNN obtains better results than LSTM, getting 70.3% exact match and 79.5 F1 score. PNN also exhibits 6× to 10× speed-up and hence more than 69% reduction in total training time.

Table 2 shows EM (exact match) and F1 scores of various models on SQuAD. The total processing time per epoch and the time used in RNNs is also reported. PNN achieves better results and operates more than 6 times faster than cuDNN LSTM. Timings are performed on a desktop machine with a single Nvidia GeForce GTX 1070 GPU and Intel Core i7-7700K Processor.

TABLE 2

| Model | # Layers | d | Size | Dev EM | Dev F1 | Time/epoch RNN | Total |
|---|---|---|---|---|---|---|---|
| (Chen et al., 2017) | 3 | 128 | 4.1 m | 69.5 | 78.8 | — | — |
| Bi-LSTM | 3 | 128 | 4.1 m | 69.6 | 78.7 | 534 s | 670 s |
| Bi-LSTM | 4 | 128 | 5.8 m | 69.6 | 78.9 | 729 s | 872 s |
| Bi-PNN | 3 | 128 | 2.0 m | 69.1 | 78.4 | 60 s | 179 s |
| Bi-PNN | 4 | 128 | 2.4 m | 69.7 | 79.1 | 74 s | 193 s |
| Bi-PNN | 5 | 128 | 2.8 m | 70.3 | 79.5 | 88 s | 207 s |

Language Modeling

Dataset: The Penn Treebank corpus (PTB) is used as the benchmark for language modeling. The processed data along with train, dev and test splits are taken from (Mikolov et al., "Recurrent neural network based language model." INTERSPEECH 2010, 11th Annual Conference of the International Speech Communication Association, Makuhari, Chiba, Japan, Sep. 26-30, 2010, pp. 1045-1048, 2010), which contains about 1 million tokens with a truncated vocabulary of 10 k. Following standard practice, the training data is treated as a long sequence (split into a few chunks for mini-batch training), and hence the models are trained using truncated back-propagation-through-time (BPTT).

Setup: The training configuration largely follows prior work (Zaremba et al., "Recurrent neural network regularization." arXiv preprint arXiv:1409.2329, 8 pages, 2014 hereinafter "Zaremba et al., 2014"; Gal, Yarin and Zoubin Ghahramani, "A theoretically grounded application of dropout in recurrent neural networks." In Advances in Neural Information Processing Systems 29 (NIPS), 14 pages, October 2016; Zoph, Barret and Quoc V. Le, "Neural architecture search with reinforcement learning." arXiv preprint arXiv: 1611.01578, 16 pages, 2016, hereinafter "Zoph and Le, 2016"). A batch size of 32 and truncated back-propagation with 35 steps are used. The dropout probability is 0.75 for the input embedding and the output softmax layer. The standard dropout and variational dropout probability is 0.2 for stacked RNN layers. Stochastic gradient descent (SGD) with an initial learning rate of 1 and gradient clipping are used for optimization. A maximum of 300 epochs are trained and the learning rate is decreased by a factor of 0.98 after 175 epochs. The same configuration is used for models with different layers and hidden dimensions.

Results: Table 3 shows the results of the PNN model and prior work. A parameter budget of 24 million is used for a fair comparison. The cuDNN LSTM implementation obtains a perplexity of 71.4 at the speed of 73~79 seconds per epoch. The perplexity is worse than most of those numbers reported in prior work and this difference may be due to the lack of variational dropout support in the cuDNN implementation. In contrast, PNN obtains a better perplexity compared to cuDNN LSTM and prior work, reaching 64.7 with 3 recurrent layers and 60.3 with 6 layers. PNN also achieves better speed-perplexity trade-off, being able to run 47 seconds per epoch given 6 RNN layers.

Table 3 shows perplexities on the PTB language modeling dataset. Models in comparison are trained using similar regularization and learning strategy: variational dropout is used except for (Zaremba et al., 2014), (Press, Ofir and Lior Wolf, Using the output embedding to improve language models." Proceedings of the 15th Conference of the European Chapter of the Association for Computational Linguistics (EACL), 7 pages, 2017, hereinafter "Press and Wolf, 2017") and cuDNN LSTM; input and output word embeddings are tied except for (Zaremba et al., 2014); SGD with learning rate decaying is used for all models. Timings are performed on a desktop machine with a single Nvidia GeForce GTX 1070 GPU and Intel Core i7-7700K Processor.

TABLE 3

| Model | # Layers | Size | Dev | Test | Time/epoch RNN | Total |
|---|---|---|---|---|---|---|
| LSTM (Zaremba et al., 2014) | 2 | 66 m | 82.2 | 78.4 | | |
| LSTM (Press and Wolf, 2017) | 2 | 51 m | 75.8 | 73.2 | | |
| LSTM (Inan et al., 2016)* | 2 | 28 m | 72.5 | 69.0 | | |
| RHN (Zilly et al., 2017)+ | 10 | 23 m | 67.9 | 65.4 | | |
| KNN (Lei et al., 2017)^ | 4 | 20 m | — | 63.8 | | |
| NAS (Zoph and Le, 2016) | — | 25 m | — | 64.0 | | |
| NAS (Zoph and Le, 2016) | — | 54 m | — | 62.4 | | |
| cuDNN LSTM | 2 | 24 m | 73.3 | 71.4 | 53 s | 73 s |
| cuDNN LSTM | 3 | 24 m | 78.8 | 76.2 | 64 s | 79 s |
| PNN | 3 | 24 m | 68.0 | 64.7 | 21 s | 44 s |
| PNN | 4 | 24 m | 65.8 | 62.5 | 23 s | 44 s |

TABLE 3-continued

| Model | # Layers | Size | Dev | Test | Time/epoch RNN | Total |
|---|---|---|---|---|---|---|
| PNN | 5 | 24 m | 63.9 | 61.0 | 27 s | 46 s |
| PNN | 6 | 24 m | 63.4 | 60.3 | 28 s | 47 s |

*Inan et al., "Tying word vectors and word classifiers: A loss framework for language modeling." arXiv preprint arXiv: 1611.01462, 13 pages, 2016.
+Zilly et al., "Recurrent highway networks." In Proceedings of the 34th International Conference on Machine Learning (ICML), 12 pages, 2017.
ˆLei et al., "Deriving neural architectures from sequence and graph kernels." ICML, 2017, Proceedings of the 34th International Conference on Machine Learning, Sydney, Australia, PMLR 70, 2017.

Machine Translation

Dataset: The WMT'14 English to German translation task is selected as the evaluation benchmark. Following standard practice (Peitz et al., "The RWTH Aachen German-English Machine Translation System for WMT 2014." Proceedings of the Ninth Workshop on Statistical Machine Translation, pp. 157-162, Baltimore, Md., Jun. 26-27, 2014; Li et al., "The DCU-ICTCAS MT system at WMT 2014 on German-English Translation Task." Proceedings of the Ninth Workshop on Statistical Machine Translation, pp. 136-141, Baltimore, Md., Jun. 26-27, 2014; Jean et al., "On using very large target vocabulary for neural machine translation." Proceedings of the 53rd Annual Meeting of the Association for Computational Linguistics and the 7th International Joint Conference on Natural Language Processing (Volume 1: Long Papers), 10 pages, 2015), the training corpus was pre-processed and about 4 million translation pairs are left after processing. The news-test-2014 data is used as the test set and the concatenation of news-test-2012 and news-test-2013 data is used as the development set.

Setup: OpenNMT (Klein et al., "OpenNMT: Open-Source Toolkit for Neural Machine Translation." Proceedings of ACL 2017, System Demonstrations, 6 pages, 2017, hereinafter "Klein et al., 2017"), an open-source machine translation system, is used for the experiments. The Pytorch version of this system is extended using PNN. The system trains a seq2seq model using a recurrent encoder-decoder architecture with attention (Luong et al., "Effective Approaches to Attention-based Neural Machine Translation." Empirical Methods in Natural Language Processing (EMNLP), Association for Computational Linguistics, 11 pages, 2015). By default, the model feeds $h_{t-1}$ (the hidden state of decoder at step t−1) as an additional input to the RNN decoder at step t. Although this can potentially improve translation quality, it also impedes parallelization and hence slows down the training procedure. This option is disabled unless otherwise specified. All models are trained with hidden and word embedding size 500, 15 epochs, SGD with initial learning rate 1.0, and batch size 64. Unlike OpenNMT's default setting, a smaller standard dropout rate of 0.1 and a weight decay of 10−5 are used. This leads to better results for both RNN implementations.

Results: Table 4 presents the translation results. PNN obtains better BLEU scores compared to the results presented in the report of OpenNMT system (Klein et al., 2017). PNN with 10 stacking layers achieves a BLEU score of 20.7 while cuDNN LSTM achieves 20.45 using more parameters and more training time. PNN is also more scalable: a PNN layer in encoder and decoder adds only 4 min per training epoch. In comparison, the rest of the operations (e.g. attention and softmax output) costs about 95 min and a LSTM layer costs 23 min per epoch. As a result, many layers of PNN can be stacked without greatly increasing the training time. Over-fitting on the dev set was not observed during the experiments.

Table 4 shows English-German translation results using OpenNMT system. The total number of parameters and the number of excluding word embeddings are shown. This setup disables $h_{t-1}$ feeding (the parameter input_feed is set to 0), which significantly reduces the training time. Adding one LSTM layer in the encoder and decoder costs an additional 23 min per training epoch, while PNN costs 4 min per training epoch. Timings are performed on a single Nvidia Titan X Pascal GPU.

TABLE 4

| Setup | # Layers | Size | | Test BLEU | Time in RNNs |
|---|---|---|---|---|---|
| (Klein et al., 2017) | 2 | — | — | 17.60 | |
| (Klein et al., 2017) + BPE | 2 | — | — | 19.34 | |
| cuDNN LSTM (wd = 0) | 2 | 85 m | 10 m | 18.04 | 149 min |
| cuDNN LSTM (wd = 10-5) | 2 | 85 m | 10 m | 19.99 | 149 min |
| cuDNN LSTM | 2 | 84 m | 9 m | 19.67 | 46 min |
| cuDNN LSTM | 3 | 88 m | 13 m | 19.85 | 69 min |
| cuDNN LSTM | 5 | 96 m | 21 m | 20.45 | 115 min |
| PNN | 3 | 81 m | 6 m | 18.89 | 12 min |
| PNN | 5 | 84 m | 9 m | 19.77 | 20 min |
| PNN | 6 | 85 m | 10 m | 20.17 | 24 min |
| PNN | 10 | 91 m | 16 m | 20.70 | 40 min |

Speech Recognition

Dataset: Switchboard-1 corpus (Godfrey et al., "SWITCHBOARD: Telephone speech corpus for research and development." Proceedings of the 1992 IEEE International Conference on Acoustics, Speech and Signal Processing (ICASSP), pp. 517-520, San Francisco, Calif., Mar. 23-26, 1992) was used for the experiments. 4,870 sides of conversations (about 300 hours speech) from 520 speakers are used as training data, and 40 sides of Switchboard-1 conversations (about 2 hours speech) from the 2000 Hub5 evaluation are used as testing data.

Setup: Kaldi (Povey et al., "The Kaldi Speech Recognition Toolkit." IEEE 2011 Workshop on Automatic Speech Recognition and Understanding, Hawaii, US, IEEE Signal Processing Society, 4 pages, 2011) was used for feature extraction, decoding, and training of initial HMM-GMM models. Maximum likelihood-criterion context-dependent speaker adapted acoustic models with Mel-Frequency Cepstral Coefficient (MFCC) features are trained with standard Kaldi recipes. Forced alignment is performed to generate labels for neural network acoustic model training. For speech recognition task, Computational Network Toolkit (CNTK) (Yu et al., "An Introduction to computational networks and the computational network toolkit." Technical Report MSR, Microsoft Research, 150 pages, 2014) was used instead of PyTorch for neural network training. Following (Sainath et al., "Convolutional, Long Short-Term Memory, Fully Connected Deep Neural Networks." IEEE International Conference on Acoustics, Speech and Signal Processing, 5 pages, 2015), all weights are randomly initialized from the uniform distribution with range [−0.05, 0.05], and all biases are initialized to 0 without generative or discriminative pretraining (Seide et al., "Feature engineering in context-dependent deep neural networks for conversational speech transcription." IEEE Workshop on Automatic Speech Recognition and Understanding (ASRU), 6 pages, 2011). All neural network models, unless explicitly stated otherwise, are trained with a cross-entropy (CE) criterion using truncated back-propagation-through-time (BPTT) (Williams and Peng, "An efficient gradient-based algorithm for on-line training of recurrent network trajectories" Neural computation, vol. 2, iss. 4, pp. 490-501, 1990) for optimization. No momentum is used for the first epoch, and a momentum of 0.9 is used for subsequent epochs (Zhang et al., "Speech recognition with prediction-adaptation-correction recurrent neural networks." 2015 IEEE International Conference on Acoustics, Speech, and Signal Processing (ICASSP), pp. 5004-5008, 2015, hereinafter "Zhang et al., 2015"). L2 constraint regularization (Hinton et al., "Improving neural networks by preventing co-adaptation of feature detectors, arXiv:1207.0580v1, 18 pages, Jul. 3, 2012) with weight 10−5 is applied.

To train the uni-directional model, 20 frames are unrolled and 80 utterances are used in each mini-batch. The output of LSTM is delayed by 10 frames as suggested in (Sak et al., "Long Short-Term Memory Recurrent Neural Network Architectures for Large Scale Acoustic Modeling." Proceedings of the Annual Conference of the International Speech Communication Association, INTERSPEECH, 5 pages, 2014) to add more context for LSTM. The performance can be further improved by using bidirectional model and state-level Minimum Bayes Risk (sMBR) training (Kingsbury et al., "Scalable Minimum Bayes Risk Training of Deep Neural Network Acoustic Models Using Distributed Hessian-free Optimization." 13th Annual Conference of the International Speech Communication Association, INTERSPEECH, pp. 10-13, 2012, hereinafter "Kingsbury et al., 2012"). To train the bidirectional model, the latency-controlled method described in (Zhang et al., 2015) was applied. Parmeters are set as Nc=80 and Nr=20 and 40 utterances were processed simultaneously. To train the recurrent model with sMBR criterion (Kingsbury et al., 2012), the two-forward-pass method described in (Zhang et al., 2015) was adopted, and 40 utterances were processed simultaneously.

The input features for all models are 80-dimensional log Mel filterbank features computed every 10 milliseconds, with an additional 3-dimensional pitch feature unless explicitly stated. The output targets are 8802-context-dependent triphone states, of which the numbers are determined by the last HMM-GMM training stage.

Results: Table 5 summarizes the results using PNN and other published results on SWBD corpus. State of the art results are achieved on this dataset with PNN. Note that LF-MMI for sequence training, i-vectors for speaker adaptation, and speaker perturbation for data augmentation have been applied in (Povey et al., "Purely sequence-trained neural networks for ASR based on lattice-free MMI." INTERSPEECH, 5 pages, 2016, hereinafter." Povey, et al., 2016"). All of these techniques can also been used for PNN. Different highway variants such as grid LSTM (Hsu et al., "A prioritized grid long short-term memory RMN for speech recognition." 2016 IEEE Spoken Language Technology Workshop (SLT), 7 pages, San Diego Calif., Dec. 13-16, 2016) may also further boost PNN. If the same highway connection is applied to LSTM, the performance is slightly worse than the baseline. Removing the dependency of h in LSTM can improve the speed but no gain for word error rate (WER). Here a customized kernel was not used for PNN because CNTK has a special batching algorithm for RNNs. Without any kernel optimization, PNN is faster than LSTM using the same amount of parameters. Table 5 shows WER of different neural models. Note that the speed numbers reported here are based on a naive implementation of PNN in CNTK. No CUDA-level optimizations are performed.

TABLE 5

| Model | # Layers | # Parameters | WER | Speed |
| --- | --- | --- | --- | --- |
| LSTM | 5 | 47M | 11.9 | 10.0K |
| LSTM + Seq | 5 | 47M | 10.8 | — |
| Bi-LSTM | 5 | 60M | 11.2 | 5.0K |
| Bi-LSTM + Seq | 5 | 60M | 10.4 | — |
| LSTM with highway (remove h) | 12 | 56M | 12.5 | 6.5K |
| LSTM with highway | 12 | 56M | 12.2 | 4.6K |
| PNN | 12 | 56M | 11.6 | 12.0K |
| PNN + sMBR | 12 | 56M | 10.0 | — |
| Bi-PNN | 12 | 74M | 10.5 | 6.2K |
| Bi-PNN + sMBR | 12 | 74M | 9.5 | — |
| Very Deep CNN + sMBR (Saon et al., 2016)* | 10 | | 10.5 | — |
| LSTM + LF-MMI (Povey et al., 2016) | 3 | | 10.3 | — |
| Bi-LSTM + LF-MMI (Povey et al., 2016) | 3 | | 9.6 | — |

*Saon et al., "The IBM 2016 English Conversational Telephone Speech Recognition System." arXiv: 1604.08242v2, 5 pages, Jun. 22, 2016

Other Applications

Neural networks may be applied to a wide variety of applications, of which classification, question answering, language modeling, machine translation, and speech recognition are just representative examples. The PNN described herein may be applied to wide variety of applications to provide one or both of reduced computation time and improved performance over other neural networks.

A PNN may be applied to any sequential modeling task where a neural network may be used to predict the probability of a next item in a sequence. For example, a PNN may be applied to language modeling, speech modeling, music modeling, image modeling, video modeling, or health data modeling.

A PNN may be applied to any sequential generation task. For example, a PNN may be applied to text generation, speech generation, music generation, image generation, video generation, or health data generation. In these applications, a PNN may be used to generate a sequence from a sampled latent distribution, such as a variational auto-encoder or a generative adversarial network.

A PNN may be applied to any sequential embedding task for metric learning. For example, a PNN may be used for document embedding, speech embedding, music embedding, image embedding, video embedding, or health data embedding. In these applications, a PNN may be used to embed items in a latent space and learn to map similar items close together and dissimilar items far apart.

A PNN may also be applied to sequence labelling (e.g., named entity recognition, part of speech tagging, or semantic role labelling); parsing (e.g., dependency and constituency, as well as other task-specific parses like abstract meaning representation); image and video captioning; topic modeling; dialogue modeling (e.g., text and/or speech); summarization; pathfinding (e.g., to allow robots to avoid objects); game playing agent (e.g., a PNN may be used as an encoder in an AlphaGo-type model); or program learning (e.g., a PNN may be used to learn algorithms like sorting from example input-output data).

Figure 10:
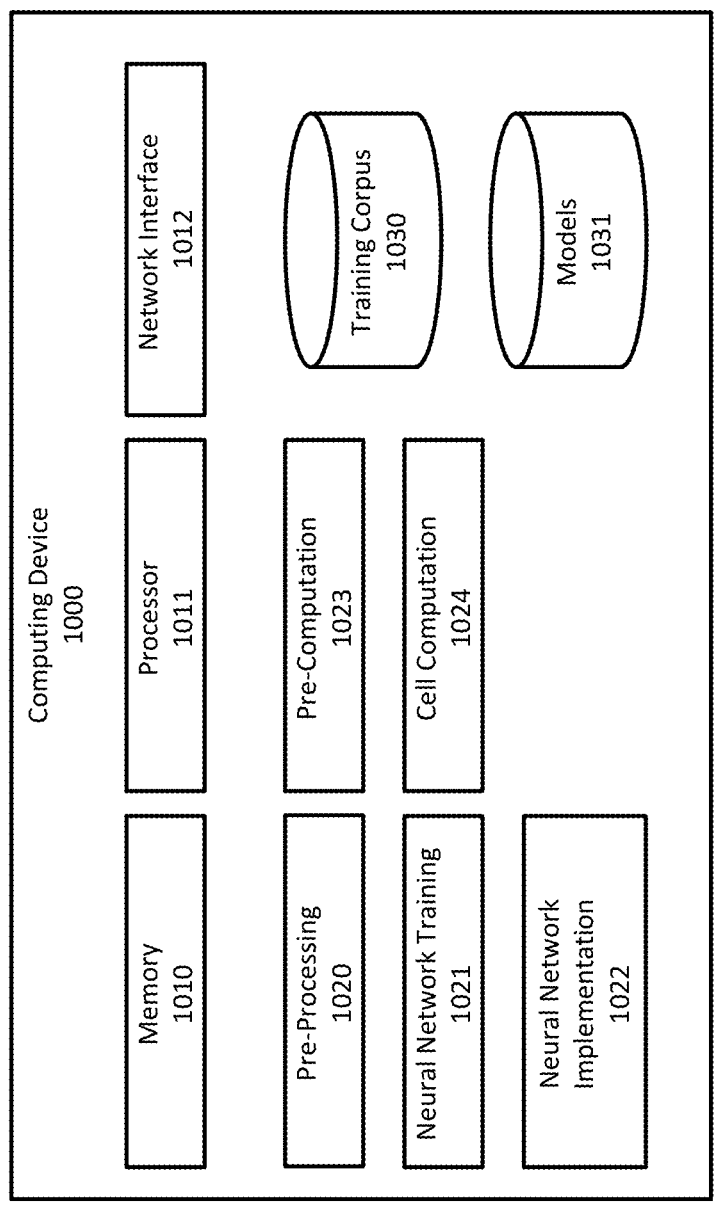
FIG. 10 is an exemplary computing device that may be used to train or implement a neural network.

FIG. 10 illustrates components of one implementation of a computing device 1000 for implementing the techniques described above. In FIG. 10, the components are shown as being on a single computing device 1000, but the components may be distributed among multiple computing devices, such as a system of computing devices, including, for example, an end-user computing device (e.g., a smart phone or a tablet) and/or a server computing device (e.g., cloud computing).

Computing device 1000 may include any components typical of a computing device, such as volatile or nonvolatile memory 1010, one or more processors 1011, and one or more network interfaces 1012. Computing device 1000 may also include any input and output components, such as displays, keyboards, and touch screens. Computing device 1000 may also include a variety of components or modules providing specific functionality, and these components or modules may be implemented in software, hardware, or a combination thereof. Below, several examples of components are described for one example implementation, and other implementations may include additional components or exclude some of the components described below.

Computing device 1000 may have a pre-processing component 1020 that preprocesses data to be processed by a neural network, such as any of the preprocessing tasks described herein. Computing device 1000 may have a neural network training component 1021 that trains a neural network using any of the techniques described herein. Computing device 1000 may have neural network implementation component 1022 that implements an application of a neural network, such as any of the applications described herein. Computing device 1000 may have a pre-computation component 1023 that performs processing whose outputs may be used by cells in later computations, such as computing matrix-vector multiplications in parallel. Computing device 1000 may have a cell computation component 1024 that performs computations of one or more neural network cells, such as any of the computations described herein.

Computing device 1000 may include or have access to various data stores. Data stores may use any known storage technology, such as files or relational or non-relational databases. Computing device 1000 may have a training corpus data store 1030 that stores training data that may be used to train a neural network, such as any of the training data described herein. Computing device 1000 may have a models data store 1031 that stores parameters of neural networks, such as parameters of any of the neural networks described herein.

The methods and systems described herein may be deployed in part or in whole through a machine that executes computer software, program codes, and/or instructions on a processor. "Processor" as used herein is meant to include at least one processor and unless context clearly indicates otherwise, the plural and the singular should be understood to be interchangeable. The present invention may be implemented as a method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A computer-implemented method for implementing a neural network, the method comprising:
    obtaining a sequence of training vectors comprising a first training vector;
    obtaining a first gate matrix corresponding to a first gate of the neural network;
    obtaining a second gate matrix corresponding to a second gate of the neural network;
    creating a combined gate matrix by combining the first gate matrix and the second gate matrix;
    creating a combined training matrix by combining the sequence of training vectors;
    computing precomputed data, wherein computing the precomputed data comprises multiplying the combined gate matrix and the combined training matrix and wherein the precomputed data comprises:
        a first precomputed vector computed using a result of a multiplication of the first gate matrix with the first training vector, and
        a second precomputed vector computed using a result of the multiplication of the second gate matrix with the first training vector;
    performing a sequence of computations for a plurality of cells of the neural network, wherein computations for a first cell of the plurality of cells comprise:
        obtaining a state vector from a previous cell,
        obtaining the first training vector,
        obtaining the first precomputed vector from the precomputed data,
        obtaining the second precomputed vector from the precomputed data,
        computing a first state vector for the first cell using the first precomputed vector and the state vector from the previous cell, and
        computing a first output vector for the first cell using the second precomputed vector and the first state vector;
    training the neural network using one or more output vectors of the sequence of computations;
    obtaining a sequence of input vectors corresponding to input from a user;
    processing the sequence of input vectors with the trained neural network to obtain a result; and
    providing the result to a device for presentation to the user.

2. The computer-implemented method of claim 1, wherein each training vector of the sequence of training vectors was computed by processing (i) a portion of a speech signal or (ii) one or more words.

3. The computer-implemented method of claim 1, wherein the result comprises performing speech recognition, determining a sentiment of text, determining a subject matter of text, answering a question in text, or translating text to another language.

4. The computer-implemented method of claim 1, wherein computing the precomputed data consists of multiplying the combined gate matrix and the combined training matrix.

5. The computer-implemented method of claim 1, wherein computing the precomputed data comprises:
    computing a first gate vector for the first gate of the neural network; and
    computing a second gate vector for the second gate of the neural network.

6. The computer-implemented method of claim 1, comprising:
    obtaining a third gate matrix corresponding to a third gate of the neural network; and
    wherein creating the combined gate matrix comprises combining the first gate matrix, the second gate matrix, and the third gate matrix.

7. The computer-implemented method of claim 1, wherein the sequence of computations for the plurality of cells of the neural network do not include any matrix-vector multiplications.

8. The computer-implemented method of claim 1, wherein computations for a second cell subsequent to the first cell comprise:
    obtaining the first state vector;
    obtaining a second training vector of the sequence of training vectors,
    obtaining a third precomputed vector from the precomputed data, wherein the third precomputed vector was computed using a result of a multiplication of the first gate matrix with the second training vector, obtaining a fourth precomputed vector from the precomputed data, wherein the fourth precomputed vector was computed using a result of a multiplication of the second gate matrix with the second training vector, computing a second state vector for the second cell using the third precomputed vector and the first state vector, and computing a second output vector for the second cell using the fourth precomputed vector and the second state vector.

9. A system for implementing a neural network, the system comprising:
at least one computer comprising at least one processor and at least one memory, the at least one computer configured to:
obtain a sequence of training vectors comprising a first training vector;
obtain a first gate matrix corresponding to a first gate of the neural network;
obtain a second gate matrix corresponding to a second gate of the neural network;
create a combined gate matrix by combining the first gate matrix and the second gate matrix;
create a combined training matrix by combining the sequence of training vectors;
compute precomputed data, wherein computing the precomputed data comprises multiplying the combined gate matrix and the combined training matrix and wherein the precomputed data comprises:
a first precomputed vector computed using a result of a multiplication of the first gate matrix with the first training vector, and
a second precomputed vector computed using a result of a multiplication of the second gate matrix with the first training vector;
perform a sequence of computations for a plurality of cells of the neural network, wherein computations for a first cell of the plurality of cells comprise:
obtaining a state vector from a previous cell,
obtaining the first training vector,
obtaining the first precomputed vector from the precomputed data,
obtaining the second precomputed vector from the precomputed data,
computing a first state vector for the first cell using the first precomputed vector and the state vector from the previous cell, and
computing a first output vector for the first cell using the second precomputed vector and the first state vector;
training the neural network using one or more output vectors of the sequence of computations;
obtaining a sequence of input vectors corresponding to input from a user;
process the sequence of input vectors with the trained neural network to obtain a result; and
providing the result to a device for presentation to the user.

10. The system of claim 9, wherein the first precomputed vector corresponds to a non-linear function of a linear transformation of the first training vector.

11. The system of claim 9, wherein the first precomputed vector corresponds to an output of multiplying the first gate matrix and the first training vector.

12. The system of claim 9, wherein the computations for the first cell do not process an output vector of the previous cell.

13. The system of claim 9, wherein the at least one computer is configured to:
compute the precomputed data by performing computations in parallel on a graphics processing unit with multiple threads; and
perform the sequence of computations for the plurality of cells of the neural network by performing computations in parallel on the graphics processing unit with multiple threads.

14. The system of claim 9, wherein the at least one computer is configured to:
obtain a transform matrix;
wherein creating the combined gate matrix comprises combining the first gate matrix, the second gate matrix, and the transform matrix;
wherein computing the precomputed data comprises multiplying the transform matrix with the first training vector and wherein the precomputed data comprises a third precomputed vector computed using a result of the multiplication of the transform matrix with the first training vector; and
compute the first state vector for the first cell using the third precomputed vector.

15. The system of claim 9, wherein the at least one computer is configured to:
obtain a second sequence of training vectors;
create the combined training matrix by combining the sequence of training vectors and the second sequence of training vectors; and
perform a second sequence of computations for the plurality of cells of the neural network, wherein the computations for a second cell of the second sequence of computations comprises obtaining a second training vector of the second sequence of training vectors.

16. One or more non-transitory computer-readable media comprising computer executable instructions that, when executed, cause at least one processor to perform actions comprising:
obtaining a sequence of input vectors comprising a first input vector, wherein the sequence of input vectors correspond to input from a user;
obtaining a first gate matrix corresponding to a first gate of a neural network;
obtaining a second gate matrix corresponding to a second gate of the neural network;
creating a combined gate matrix by combining the first gate matrix and the second gate matrix;
creating a combined input matrix by combining the sequence of input vectors;
computing precomputed data wherein computing the precomputed data comprises multiplying the combined gate matrix and the combined input matrix and wherein the precomputed data comprises:
a first precomputed vector computed using a result of a multiplication of the first gate matrix with the first input vector, and
a second precomputed vector computed using a result of a multiplication of the second gate matrix with the first input vector;
performing a sequence of computations for a plurality of cells of the neural network, wherein computations for a first cell of the plurality of cells comprise:
obtaining a state vector from a previous cell,
obtaining the first input vector,
obtaining the first precomputed vector from the precomputed data, obtaining the second precomputed vector from the precomputed data, computing a first state vector for the first cell using the first precomputed vector and the state vector from the previous cell, and computing a first output vector for the first cell using the second precomputed vector and the first state vector;

processing the sequence of input vectors with the neural network to obtain a result; and providing the result to a device for presentation to the user.

17. The one or more non-transitory computer-readable media of claim 16, wherein:

the neural network is a recurrent neural network;

the first gate is a forget gate; and the second gate is a reset gate.

18. The one or more non-transitory computer-readable media of claim 16, wherein the neural network comprises long short-term memory.

19. The one or more non-transitory computer-readable media of claim 16, wherein the neural network is a bidirectional neural network.

20. The one or more non-transitory computer-readable media of claim 16, wherein precomputed matrix is computed before commencing performing the sequence of computations for the plurality of cells of the neural network.

\* \* \* \* \*

UNITED STATES PATENT AND TRADEMARK OFFICE
CERTIFICATE OF CORRECTION

PATENT NO. : 11,106,975 B2  
APPLICATION NO. : 15/789241  
DATED : August 31, 2021  
INVENTOR(S) : Tao Lei Page 1 of 1

It is certified that error appears in the above-identified patent and that said Letters Patent is hereby corrected as shown below:

On the Title Page

In item (56), in Column 2, under "Other Publications", Line 9, delete "33th" and insert -- 33rd --, therefor.

On the page 2, in Column 1, under "Other Publications", Line 4, delete ""ReadingWikipedia" and insert -- "Reading Wikipedia --, therefor.

On the page 2, in Column 1, under "Other Publications", Line 39, delete "RMN" and insert -- RNN --, therefor.

In the Specification

In Column 8, Line 3, delete "$W_r x_i$." and insert -- $W_r x_1$. --, therefor.

In Column 15, Line 8, delete "arXiv: 1611.01462," and insert -- arXiv:1611.01462, --, therefor.

In Column 17, Line 30, delete "Parmeters" and insert -- Parameters --, therefor.

In Column 17, Line 53, delete "RMN" and insert -- RNN --, therefor.

In Column 18, Line 19, delete "arXiv: 1604.08242v2," and insert -- arXiv:1604.08242v2, --, therefor.

In Column 18, Line 19, after "2016" insert -- . --.

Signed and Sealed this  
Seventeenth Day of September, 2024

Katherine Kelly Vidal  
*Director of the United States Patent and Trademark Office*